US008270811B2

(12) United States Patent
Inokuchi et al.

(10) Patent No.: US 8,270,811 B2
(45) Date of Patent: Sep. 18, 2012

(54) INFORMATION MANAGEMENT METHOD, INFORMATION PLAYBACK APPARATUS, AND INFORMATION MANAGEMENT APPARATUS

(75) Inventors: Tatsuya Inokuchi, Tokyo (JP); Tsutomu Ichinose, Tochigi (JP)

(73) Assignee: Sony Corporation, Tokyo (JP)

( * ) Notice: Subject to any disclaimer, the term of this patent is extended or adjusted under 35 U.S.C. 154(b) by 1133 days.

(21) Appl. No.: 11/152,235

(22) Filed: Jun. 15, 2005

(65) Prior Publication Data

US 2005/0281540 A1 Dec. 22, 2005

(30) Foreign Application Priority Data

Jun. 18, 2004 (JP) .................................. 2004-181371

(51) Int. Cl.
*H04N 9/80* (2006.01)
*H04N 5/765* (2006.01)

(52) U.S. Cl. ........ 386/252; 386/200; 386/232; 386/239; 386/248

(58) Field of Classification Search .................... 386/94, 386/200–234, 239–262, 353–357; 360/8; 709/229

See application file for complete search history.

(56) References Cited

U.S. PATENT DOCUMENTS

| 2001/0015408 | A1 | 8/2001 | Stock |
| 2001/0032088 | A1 | 10/2001 | Utsumi et al. |
| 2001/0034714 | A1* | 10/2001 | Terao et al. ..................... 705/57 |
| 2001/0056404 | A1* | 12/2001 | Kuriya et al. ................... 705/51 |
| 2002/0035526 | A1* | 3/2002 | Kutaragi et al. ................ 705/34 |
| 2002/0156742 | A1* | 10/2002 | Ogino et al. .................... 705/57 |
| 2002/0180782 | A1* | 12/2002 | Natsuno ......................... 345/743 |
| 2004/0097143 | A1* | 5/2004 | Iwasaki et al. ................. 439/894 |
| 2004/0223740 | A1* | 11/2004 | Itoi .................................. 386/95 |
| 2005/0022603 | A1 | 2/2005 | Lehmann et al. |
| 2005/0053360 | A1* | 3/2005 | Jung et al. ........................ 386/95 |
| 2006/0066970 | A1* | 3/2006 | Arai et al. ......................... 360/8 |
| 2006/0077778 | A1* | 4/2006 | Tatum et al. ............... 369/44.11 |
| 2006/0156355 | A1* | 7/2006 | Kawasaki et al. ............... 725/88 |
| 2006/0274757 | A1* | 12/2006 | Kikkoji et al. ............. 370/395.2 |

FOREIGN PATENT DOCUMENTS

EP 1 045 386 A1 10/2000

(Continued)

OTHER PUBLICATIONS

International Search Report; International Application No. PCT/CH2006/000289; mailed Aug. 1, 2006.

(Continued)

*Primary Examiner* — Thai Tran
*Assistant Examiner* — Hung Dang
(74) *Attorney, Agent, or Firm* — Oblon, Spivak, McClelland, Maier & Neustadt, L.L.P.

(57) ABSTRACT

An information management method for managing whether to allow playback of copyrighted content includes an invalidating step, executed by playback management means when an invalidating request for content recorded on a recording medium is received, of registering the content in playback-management information as being in a playback-prohibition state; a playback processing step, executed by playback controlling means when a playback request for content on the recording medium is received, of permitting playback only when the content is not in the playback-prohibition state with reference to the playback-management information; and an invalidation canceling step, executed by the playback controlling means when playback-permission information associated with content in the playback-prohibition state is obtained, of updating the playback-management information so that the playback-prohibition state of the content is canceled.

19 Claims, 16 Drawing Sheets

FOREIGN PATENT DOCUMENTS

| | | |
|---|---|---|
| EP | 1 045 388 A1 | 10/2000 |
| EP | 1 128 280 A2 | 8/2001 |
| EP | 1 450 139 A2 | 8/2004 |
| FR | 2 735 236 | 12/1996 |
| JP | 11-33795 | 2/1999 |
| JP | 11-259964 | 9/1999 |
| JP | 11-259971 | 9/1999 |
| JP | 11-328851 | 11/1999 |
| JP | 2000-298974 | 10/2000 |
| JP | 2000-347696 | 12/2000 |
| JP | 2000-347946 | 12/2000 |
| JP | 2001-100933 | 4/2001 |
| JP | 2001-195825 | 7/2001 |
| JP | P2000-272063 * | 7/2001 |
| JP | 2002-150165 | 5/2002 |
| JP | 2002-313019 | 10/2002 |
| JP | 2002-334559 | 11/2002 |
| JP | 2003-110984 | 4/2003 |
| JP | 2003-151242 | 5/2003 |
| JP | 2003-319370 | 11/2003 |
| JP | 2003-323351 | 11/2003 |
| JP | 2004-5816 | 1/2004 |
| JP | 2004-87075 | 3/2004 |
| JP | 2004-139581 | 5/2004 |
| WO | WO 02/097693 A3 | 12/2002 |
| WO | WO 2005/093989 A1 | 10/2005 |

OTHER PUBLICATIONS

Office Action issued Jun. 7, 2011, in Japan Patent Application No. 2009-260824.

Office Action issued Feb. 8, 2011, in Japanese Patent Application No. 2009-260824.

* cited by examiner

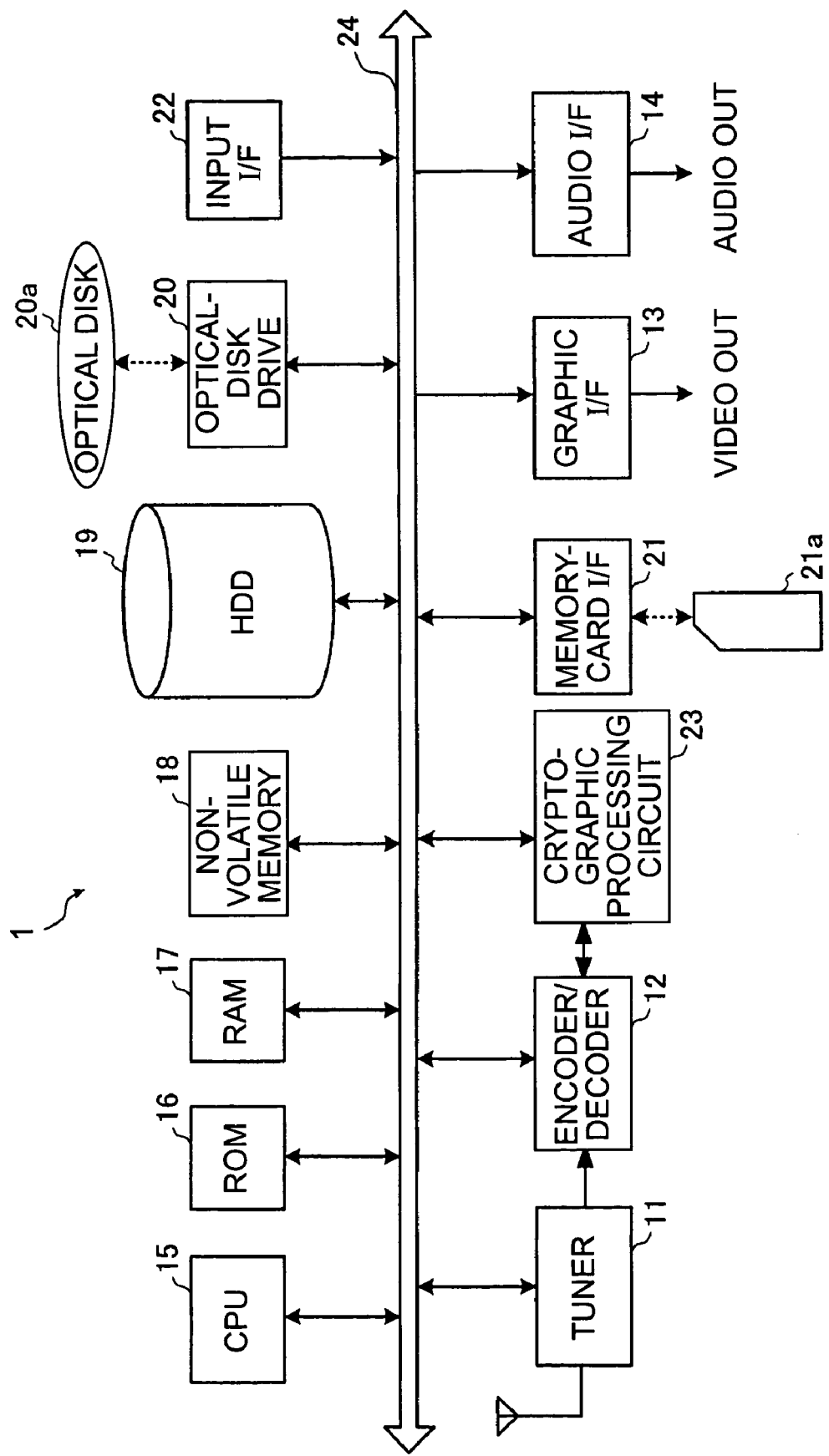

INFORMATION MANAGEMENT METHOD, INFORMATION PLAYBACK APPARATUS, AND INFORMATION MANAGEMENT APPARATUS

CROSS REFERENCES TO RELATED APPLICATIONS

The present invention contains subject matter related to Japanese Patent Application JP 2004-181371 filed in the Japanese Patent Office on Jun. 18, 2004, the entire contents of which are incorporated herein by reference.

BACKGROUND OF THE INVENTION

1. Field of the Invention

The present invention relates to an information management method, an information playback apparatus, and an information management apparatus for managing whether to allow playback of copyrighted content. More specifically, the present invention relates to an information management method, an information playback apparatus, and an information management apparatus with which convenience is improved in cases where content is transferred between recording media.

2. Description of the Related Art

Recently, use of digital content such as video and audio content has become common, and recorders and players that allow recording and playback of these types of digital content have also become readily available. For example, video recorders that allow broadcasting content to be written on DVDs (Digital Versatile Disks) or HDDs (Hard Disk Drives) are rapidly becoming common. Furthermore, in addition to digital broadcasting via broadcasting satellites, terrestrial digital broadcasting has recently started. In these types of digital broadcasting, HDTV (High Definition TeleVision) video images having a resolution higher than that of conventional broadcasting are provided. Video recorders that allow broadcasting content to be recorded on an optical disk or the like while maintaining the original image quality are being developed.

As it becomes readily possible to save high-quality digital content on a portable recording medium, copyright protection for digital content becomes more important. Generally, data of current video content is accompanied by copy control information (CCI) indicating whether copying is allowed. For example, by using copy control information, for data of each piece of video content, it is possible to specify no restriction of copying (copy free), permission for copying only once (copy once), prohibition of copying (copy never), or the like. In the case of the digital broadcasting mentioned above, all content is accompanied by copy control information specifying "copy once", and video recorders usually record such content on recording medium with the copy control information changed to "copy never".

Video content recorded on a recording medium as "copy never" is allowed to be copied to another recording medium on condition that the data on the recording medium is deleted (or invalidated). The operation of copying data to another recording medium while deleting the original data is referred to as a "move". For example, when a user considers that certain video content received through digital broadcasting and recorded on an HDD of a video recorder is to be saved over a long period, the video content can be moved to a portable recording medium such as a DVD. This improves convenience for the user while preventing illegitimate multiple copying.

Various techniques have been proposed to facilitate handling of content in move operations. For example, in a type of data communication system, when music content on a CD (Compact Disc) is moved from a server to a memory card, information regarding pieces of music that has been moved is stored in the memory card as transfer-history management data, so that it is possible to manage the content by the same order of pieces of music when the content is returned (moved) from the memory card to the server. This is disclosed, for example, in Japanese Unexamined Patent Application Publication No. 2001-76464 (paragraph numbers [0200] to [0202] and FIG. 36).

SUMMARY OF THE INVENTION

As described above, although copyright protection of digital content is being developed, the environment for users to enjoy digital content is expanding. For example, portable players in which semiconductor memories, small HDDs, or the like are used as recording media have become available, and it is possible to transfer digital content accumulated on a personal computer (PC) or the like to a portable player and to enjoy the digital content away from home. Since different recording media suitable under different viewing or listening environments are used, the user has to transfer digital content to another recording medium in accordance with the viewing or listening environment.

In using digital content specified as "copy once" on various recording media, the following three problems are anticipated. First, for example, considering a case where content recorded on a recorder installed at home is moved to a portable player and the user goes out, if the user does not finish viewing or listening to the content away from home and wishes to continue viewing or listening at home, the user has to move data of the content back to the recorder at home. Particularly in the case of data having a large volume, such as video content, it takes some time to move the content. As described above, a first problem is that a new work is imposed on the user.

A second problem is that the quality of content could be degraded in the course of repeated moves. For example, since an installed video recorder that employs a DVD or an HDD has a relatively large recording capacity, quality is considered to be important when video content is recorded. Thus, the amount of data of video content recorded is large. In contrast, in the case of portable video players, recording medium having relatively small storage capacities, such as memory cards, are used, and display screens are small. Thus, video content of a degraded quality, having a small amount of data, is recorded.

Thus, content with its data amount reduced by degrading image quality is moved from an installed video recorder to a portable video player. When the content is subsequently moved back to the installed video recorder, only the content with its quality degraded can be played back. That is, when moves are repeated, the quality of content is changed to a quality optimal for an apparatus of lowest performance in the course of the moves.

Furthermore, a third problem is that the user has to be constantly aware of which recording media currently carries data of desired content. Particularly, as individuals will come to use digital content more often by a large number of apparatuses, such as installed video recorders and PCs, special-purpose players that employ memory cards or the like, and portable information devices such as cellular phones or PDAs (Personal Digital Assistants), it is not easy to be constantly aware of a device on which content that can be played back is recorded.

As described above, although digital content specified as "copy once" can be moved to another recording medium, the move could cause inconvenience for the user.

It is desired that a highly convenient information management method that allows copyrighted content to be moved to different recording media a plurality of times without degrading its quality, and an information playback apparatus and an information management apparatus for the information management method, are provided.

According to an embodiment of the present invention, an information management method for managing whether to allow playback of copyrighted content is provided. The information management method includes an invalidating step, executed by playback management means when an invalidating request for content recorded on a recording medium is received, of registering the content in playback-management information as being in a playback-prohibition state; a playback processing step, executed by playback controlling means when a playback request for content on the recording medium is received, of permitting playback only when the content is not in the playback-prohibition state with reference to the playback-management information; and an invalidation canceling step, executed by the playback controlling means when playback-permission information associated with content in the playback-prohibition state is obtained, of updating the playback-management information so that the playback-prohibition state of the content is canceled.

According to the information management method, in the invalidating step, content relevant to the invalidating request among content on the recording medium is registered in the playback-management information as being in the playback-prohibition state. In the playback processing step, playback of the content entered into the playback-prohibition state in the playback-management information is prohibited. Thus, when content that can be copied only once is transferred to another recording medium, the content can be transferred virtually without deleting the data of the content recorded on the source recording medium. Furthermore, in the invalidation canceling step, when the playback-permission information is obtained, the playback-management information is updated so that playback of the associated content is allowed again. Thus, by virtually transferring the content from the another recording medium to the source recording medium, it becomes possible to play back the data of the content that has been invalidated.

Furthermore, according to another embodiment of the present invention, an information management method for managing whether to allow playback of copyrighted content using one or more information playback apparatuses for playing back content recorded on a recording medium and an information management apparatus that communicates with the information playback apparatuses to manage playback permission of content at the information playback apparatuses is provided. The information management method includes an invalidating step, executed by playback management means of one of the information playback apparatuses when an invalidating request for content recorded on the recording medium is received, of registering the content in playback management information in the information playback apparatus as being a playback-prohibition state; a first playback processing step, executed by playback controlling means of the information playback apparatus when a playback request for content that is not in the playback-prohibition state on the recording medium is received, of permitting playback of the content based on the playback-management information; a playback-permission requesting step, executed by the playback controlling means of the information playback apparatus when a playback request for content that is in the playback-prohibition state on the recording medium is received, of requesting the information management apparatus to issue playback permission for the content based on the playback-management information; a temporary-permission sending step, executed by playback-status management means of the information management apparatus when a playback-permission request for content is received from the information playback apparatus, of returning temporary-permission information for temporarily permitting playback only when the content is not being played back by another one of the information playback apparatuses; and a second playback processing step, executed by the playback controlling means of the information playback apparatus when the temporary-permission information from the information management apparatus is received, of temporarily permitting playback of the associated content on the recording medium.

According to the information management method, in the invalidating step, content relevant to the invalidating request among content on the recording medium is registered in the playback-management information as being in the playback-prohibition state. In the first playback processing step, playback of the content entered into the playback-prohibition state in the playback-management information is prohibited. Thus, when content that can be copied only once is transferred to another recording medium, the content can be transferred virtually without deleting the data of the content recorded on the source recording medium.

Furthermore, in the playback-permission requesting step, the temporary-permission sending step, and the second playback processing step, communication is executed between the information playback apparatus and the information management apparatus. When a playback-permission request for content entered into the playback-prohibition state is sent to the information management apparatus, the information management apparatus temporarily permits playback only when the content is not being played back by another information playback apparatus. Thus, in a case where content having the same invalidated identification information is recorded on a plurality of information playback apparatuses, playback of the content is allowed only by a single information playback apparatus under the information management apparatus, whereby the content is virtually transferred.

The information management method may further include a returning requesting step, executed by the playback management means of the information playback apparatus, of sending a returning request for allowing playback of content entered into the playback-prohibition state on the recording medium to the information management apparatus; a playback-permission sending step, executed by the playback-status management means of the information management apparatus when the returning request for content is received, of returning playback-permission information for the content only when the content is not being played back by another one of the information playback apparatuses; and an invalidation canceling step, executed by the playback management means of the information playback apparatus when the playback-permission information is received, of updating the playback-management information so that the playback-prohibition state of the associated content on the recording medium is canceled.

In these steps, similarly, when a returning request for content entered into the playback-prohibition state is sent to the information management apparatus, the information management apparatus returns playback-permission information and cancels the playback-prohibition state only when the content is not being played back by another information playback apparatus. Thus, the content is virtually moved from another recording medium to the source recording medium, whereby it becomes possible to play back the data of the original content that has been invalidated.

According to these embodiments of the present invention, even when content on a recording medium has been moved to another recording medium, data of the original content is not deleted. Thus, when the content is transferred to the source recording medium, the original content can be played back without degrading its quality. When content is virtually moved to other recording media and recorded on a plurality of information playback apparatuses of which only one is allowed to play back the content, the quality of the original content can be maintained. That is, even when the content is transferred a plurality of times, degradation of the quality of the original content can be avoided.

Furthermore, for example, when content that has once been transferred to another recording medium is returned to the source recording medium, data of the content need not be transferred. Thus, the time needed for the transfer is reduced, so that convenience for the user is improved.

Furthermore, in a case where an information management apparatus that manages re-permission of content is provided externally to the information playback apparatus, when content in the information playback apparatus is entered into the playback-prohibition state, communication with the information management apparatus is executed, and playback or returning of the content is allowed only when the content is not being played back by another information playback apparatus. Thus, the user need not be constantly aware of which content virtually transferred between recording media can be currently played back. Since the user can play back content by a playback apparatus simply by connecting the playback apparatus with the information management apparatus through communication. This further improves convenience for the user.

BRIEF DESCRIPTION OF THE DRAWINGS

FIG. 1 is a block diagram showing the construction of a video recorder according to a first embodiment of the present invention;

DESCRIPTION OF THE PREFERRED EMBODIMENTS

Figure 2A:
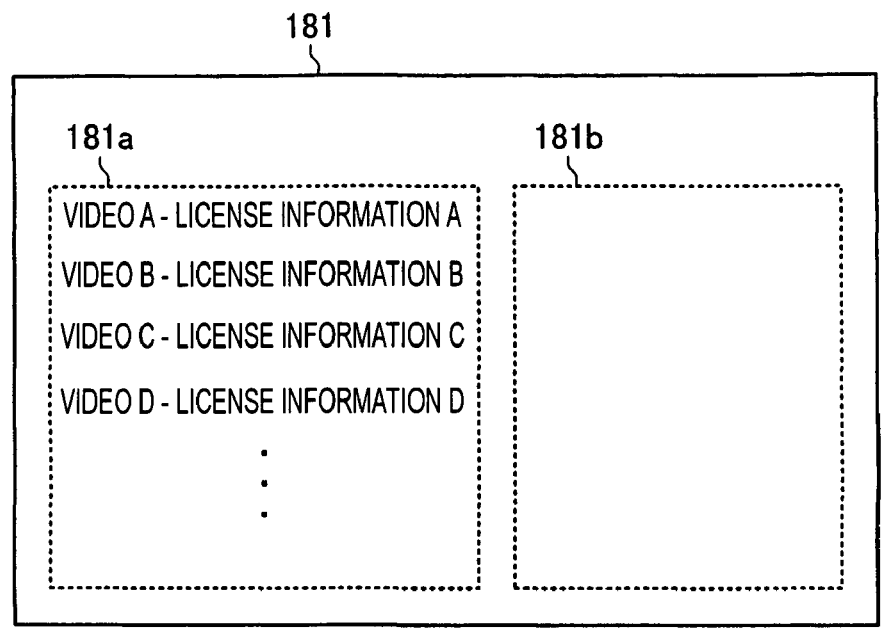
FIGS. 2A and 2B are diagrams showing the data structures of playback management information.

Now, embodiments of the present invention will be described in detail with reference to the drawings. In the embodiments described below, it is assumed that video content is used as an example of digital content. Video content herein includes both video content and audio content that is played back in synchronization with the video content.

First Embodiment

In a first embodiment described below, a video recorder that is capable of receiving and recording digital broadcasting is used as an example of a playback apparatus that is capable of playing back video content recorded on a recording medium and transferring the video content to another recording medium, and applications of the present invention to the video recorder will be described.

FIG. 1 is a block diagram showing the construction of a video recorder according to a first embodiment of the present invention.

A video recorder 1 shown in FIG. 1 includes a tuner 11, an encoder/decoder 12, a graphic interface (I/F) 13, an audio I/F 14, a CPU (Central Processing Unit) 15, a ROM (Read Only Memory) 16, a RAM (Random Access Memory) 17, a non-volatile memory 18, an HDD 19, an optical-disk drive 20, a memory-card I/F 21, an input I/F 22, and a cryptographic processing circuit 23. In the video recorder 1, the CPU 15 is connected to the components in the apparatus via an internal bus 24, and it exercises overall control on the components.

The tuner 11, in response to input of a broadcasting wave received by an external antenna, selects a signal of a predetermined carrier frequency according to an instruction from the CPU 15, and it executes QPSK (Quadrature Phase Shift Keying) demodulation and error correction on the reception signal selected. Then, the tuner 11 separates a video stream and an audio stream from a processed transport stream, and transfers the video stream and the audio stream to the encoder/decoder 12, the HDD 19, or the like according to an instruction from the CPU 15. Furthermore, the tuner 11 separates from the transport stream an EPG (Electronic Program Guide) or other additional information for data broadcasting, copy control information, license information such as key data for encryption, and so forth, and transfers these pieces of information to the CPU 15.

The encoder/decoder 12 executes compression encoding and decompression decoding on video and audio data according to the MPEG (Moving Picture Experts Group) standard. For example, the encoder/decoder 12 decodes encoded video and audio data fed from the tuner 11, the HDD 19, the optical-disk drive 20, the memory-card I/F 21, and so forth, and outputs processed video and audio data to the graphic I/F 13 and the audio I/F 14, respectively. Actually, the video data and audio data from the HDD 19, the optical-disk drive 20, and the memory-card I/F 21 are fed to the encoder/decoder 12 via the cryptographic processing circuit 23. Also, the encoder/decoder 12 can re-encode encoded video and audio data fed from the HDD 19 or the optical-disk drive 20 to change the resolution, bit rate, or the like, and output the resulting data to the memory-card I/F 21 or the like via the cryptographic processing circuit 23.

The graphic I/F 13 converts video data decoded by the encoder/decoder 12, for example, into analog signals, and outputs the analog signals to an external television receiver or the like. At this time, the graphic I/F 13 may combine the decoded video data with OSD (On Screen Display) image data, such as a GUI image generated through processing by the CPU 15. The audio I/F 14 converts audio data decoded by the encoder/decoder 12, for example, into analog signals, and outputs the analog signals to a television receiver, an audio apparatus, or the like.

The CPU 15 exercises overall control on the components of the video recorder 1 by executing programs stored, for example, in the ROM 16. In the ROM 16, an OS (Operating System), a BIOS (Basic Input/Output System), application programs, and various types of data are stored in advance. The RAM 17 temporarily stores at least parts of programs executed by the CPU 15, and various types of data needed for processing according to the programs.

The non-volatile memory 18 is implemented, for example, by an EEPROM (Electronically Erasable and Programmable Read Only Memory), in which programs executed by the CPU 15 and data needed for encryption and decryption or other processing are recorded in advance. Particularly, in this embodiment, as will be described later, playback-management information for managing license information that is needed when moving video content is recorded, which can be rewritten as needed when recording or moving video content.

The HDD 19 is a storage device having a relatively large capacity, for example, 100 GBytes, so that data of video content of a long period can be recorded. The HDD 19 writes and reads data according to commands and address information specified by the CPU 15. On the HDD 19, data of video content, additional information for data broadcasting, and so forth are recorded. Furthermore, on the HDD 19, programs executed by the CPU 15, data needed for the execution, and so forth may be stored.

On the optical-disk drive 20, an optical disk 20a, such as a DVD, is mounted. The optical-disk drive 20 reads data from and writes data to the optical disk 20a. On the optical-disk 20a, for example, data of broadcasting content received by the video recorder 1 or by other apparatuses is recorded.

To the memory-card I/F 21, a memory card 21a including a flash memory is attached. The memory-card I/F 21 reads data from and writes data to the memory card 21a. On the memory card 21a, for example, data of video content copied or moved from the HDD 19 is recorded.

The input I/F 22 includes, for example, a receiving circuit that receives infrared signals from a remote controller (not shown), operation keys that allow operations by the user. The input I/F 22 feeds control signals in accordance with input operations by the user to the CPU 15.

The cryptographic processing circuit 23 executes encryption and decryption needed when, for example, copyrighted video content is moved. For example, the cryptographic processing circuit 23 executes encryption when data of video content is recorded on the HDD 19, the optical disk 20a, or the memory card 21a, and executes decryption when the data is read therefrom.

Now, a basic operation of the video recorder 1 will be described.

When the user views and listens to broadcasting content of digital broadcasting, the CPU 15 outputs channel-selection information to the tuner 11 based on a control signal from the input I/F 22. The tuner 11 tunes in to a reception signal of a carrier frequency in accordance with the selection information input thereto, executes demodulation and error correction, and separates a video stream, an audio stream, additional information for data broadcasting, copy control information, license information, and so forth from a processed transport stream.

The video stream and audio stream separated are decoded by the encoder/decoder 12, and the decoded video data and audio data are fed to the graphic I/F 13 and the audio I/F 14, respectively. Thus, the broadcasting content of the selected channel is played back and output, for example, by an external television receiver (not shown).

The additional information for data broadcasting, output from the tuner 11, is fed to the graphic I/F 13 according to an operation input by the user via the input I/F 22, together with certain OSD image data generated through processing by the CPU 15, and is displayed together with a moving image.

Furthermore, for example, when data of the broadcasting content received is recorded on the HDD 19, the video stream and audio stream separated by the tuner 11 are fed to and recorded on the HDD 19 only when the CPU 15 determines that copying of the content is allowed with reference to the copy control information separated by the tuner 11. At this time, the data of these streams is encrypted as needed through processing by the cryptographic processing circuit 23 before it is fed to the HDD 19. Similarly, when the broadcasting content is directly recorded on the optical disk 20a, the video stream and audio stream from the tuner 11 are encrypted as needed before these streams are fed to the optical-disk drive 20 and recorded on the optical disk 20a.

When video content recorded on the HDD 19 is played back, a video stream and an audio stream constituting the video content are read from the HDD 19 and decoded by the encoder/decoder 12, and the decoded data is fed to the graphic I/F 13 and the audio I/F 14, whereby video signals and audio signals are output from the apparatus. When the data of the video content recorded on the HDD 19 has been encrypted, the data is decrypted through processing by the cryptographic processing circuit 23 before it is fed to the encoder/decoder 12. Similar processes are executed when video content recorded on the optical disk 20a or the memory card 21a is played back.

Next, how video content is moved will be described.

For example, in a type of copyrighted video content that is supplied as broadcasting content, copy control information specifying "copy once", i.e., recording only once is permitted, is attached. When such "copy once" video content is once recorded on a recording medium, subsequently the video content can be recorded on another recording medium only by a "move" operation, by which the data on the source recording medium is deleted.

In this embodiment, in a move operation, the data of the content on the source recording medium is left undeleted, and only license information associated with the content is deleted and moved to a recording medium or external device at a move destination. The license information serves as permission for playing back the associated content, and when the license information is deleted, the content on the source recording medium enters a state where playback is prohibited (i.e., the content is invalidated). When the content once moved to another recording medium is moved back to the source recording medium, instead of transferring the data of the content itself, only the associated license information is obtained, whereby the playback of the invalidated content on the source recording medium is permitted again. Through the operation described above, a virtual move is executed without deleting or altering the content data on the source recording medium, so that copyright is protected safely.

In order to allow this operation, in this embodiment, in the video recorder 1, regarding "copy once" video content, the data of the content itself and license information associated therewith are separated, and the license information is stored and managed in "playback-management information" in the non-volatile memory 18.

Figure 2B:
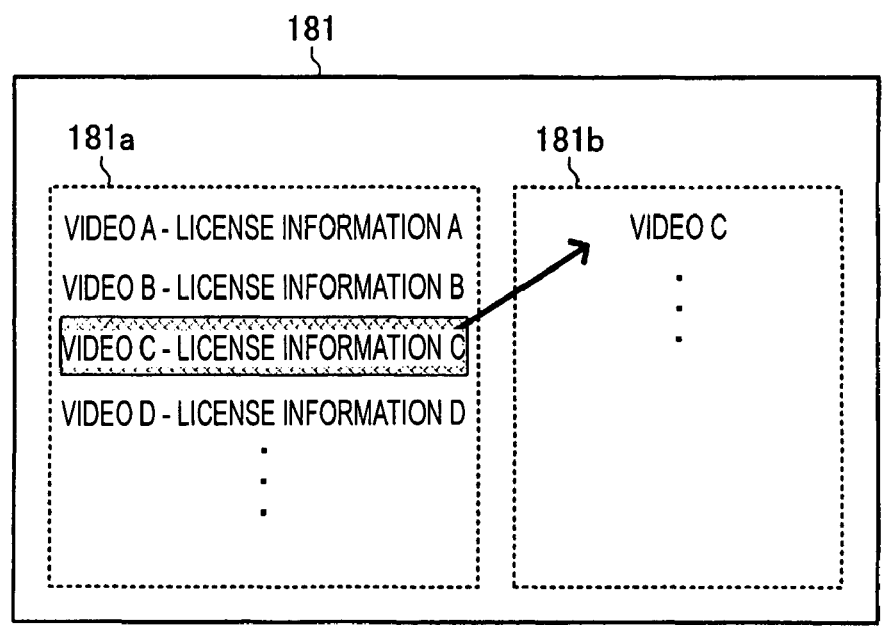

FIGS. 2A and 2B are diagrams showing data structures of the playback-management information.

As shown in FIG. 2A, playback-management information 181 includes a playback-permission area 181a and a playback-prohibition area 181b. The playback-permission area 181a stores license information of video content that is permitted to be played back among video content recorded on the HDD 19. More specifically, content IDs assigned uniquely to respective pieces of video content in the HDD 19 and license information needed for playing back the respective pieces of video content are stored in association with each other. For example, in FIG. 2A, "license information A" is associated with a content ID "video A", and "license information B" is associated with a content ID "video B".

In the playback-prohibition area 181b, content IDs of video content recorded in the HDD 19 but invalidated by moves are stored. As shown in FIG. 2B, when video content in the HDD 19 is moved, the associated license information is picked up from the playback-permission area 181a and sent to the move destination, and the content ID of the video content is recorded in the playback-prohibition area 181b. In the example shown in FIG. 2B, video content identified by a content ID "video C" is moved, "license information C" associated therewith is transferred to the memory card 21a while deleting the corresponding information in the playback-permission area 181a, and the content ID "video C" is recorded in the playback-prohibition area 181b. Thus, the video content identified by "video C" is virtually moved.

When video content corresponding to a content ID recorded in the playback-prohibition area 181b is moved back from another recording medium to the HDD 19, the license information of the video content is recorded again in the playback-permission area 181a, and the corresponding content ID in the playback-prohibition area 181b is deleted. Thus, the data of video content that has been invalidated in the HDD 19 returns to a state where playback is permitted.

The license information may include, for example, one or more of the following pieces of information: key data used for encryption when moving video content to another recording medium; a part of data constituting the key data or information for generating the key data; information that permits viewing/listening; information for restricting viewing/listening time; playback control information for restricting apparatuses that can play back the video content or recording media to which the video content can be transferred; secret information for permitting playback (e.g., a password), and the like.

As an example, a move between the HDD 19 and the memory card 21a will be described below. It this example, it is assumed that video content recorded on the memory card 21a is played back by a portable terminal.

Figure 3A:
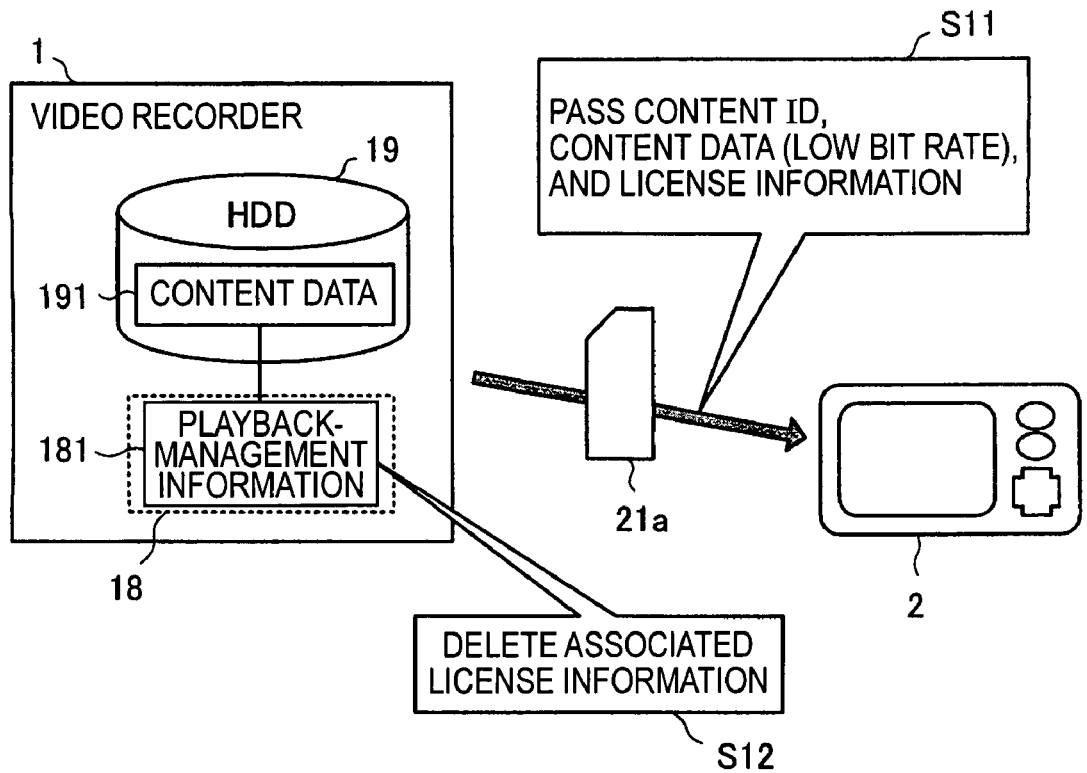
FIGS. 3A and 3B are diagrams showing the schemes of move operations between the video recorder and a portable terminal.
Figure 3B:
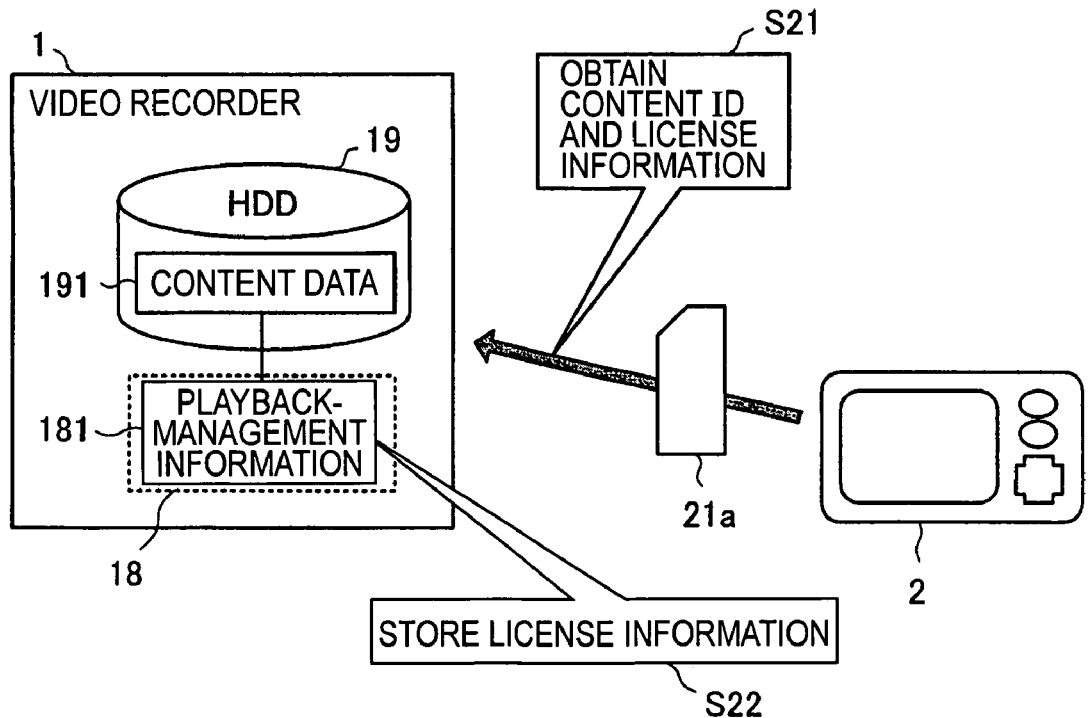

FIGS. 3A and 3B are diagrams showing the schemes of move operations between a video recorder and a portable terminal.

First, in the video recorder 1, data of copyrighted video content (content data 191) is recorded on the HDD 19, and at this time, associated license information is recorded together with a content ID in the playback-management information 181 in the non-volatile memory 18. A case where video content is moved to the memory card 21a from this state will be considered.

The storage capacity of the memory card 21a is much smaller than that of the HDD 19, and the resolution of the display screen of a portable terminal 2 is lower than that of a television apparatus connected to the video recorder 1. Thus, usually, before the video content on the HDD 19 is recorded on the memory card 21a, the bit rate is reduced, for example, by reducing the image resolution, to reduce the data volume. When a move operation is started, the content data 191 in the HDD 19 is once decoded by the encoder/decoder 12 and then re-encoded so as to reduce the bit rate, and the data of the re-encoded video content is recorded on the memory card 21a.

Together with the data of the video content, the associated license information and content ID in the playback-management information 181 are recorded on the memory card 21a (step S11 in the FIG. 3A). Furthermore, the corresponding license information in the playback-permission area 181a of the playback-management information 181 is deleted, and the content ID of the video content moved is recorded in the playback-prohibition area 181b (step S12). Thus, playback of the content data 191 in the HDD 19 is prohibited, whereby the video content is virtually moved.

Also, for example, when the memory card 21a is attached to the portable terminal 2, the data of the video content with the reduced bit rate, the content ID, and the license information are passed to the portable terminal 2, so that the portable terminal 2 is allowed to play back the video content with the reduced bit rate using the license information.

As shown in FIG. 3B, when the video content that has been moved is moved back from the portable terminal 2 to the HDD 19 of the video recorder 1, the memory card 21a having recorded thereon the data of the video content with the reduced bit rate and the license information is again attached to the video recorder 1. At this time, since the content ID of the video content in the memory card 21a is recorded in the playback-prohibition area 181b of the playback-management information 181, the video recorder 1 can recognize that the content data 191 having the same content ID is recorded as invalidated on the HDD 19.

Thus, the video recorder 1 reads only the content ID and the license information from the memory card 21a (step S21), writes the license information to the playback-permission area 181a of the playback-management information 181, and deletes the corresponding content ID from the playback-prohibition area 181b (step S22). At this time, the license information in the memory card 21a is deleted. Furthermore, the data of the video content with the reduced bit rate may also be deleted.

Through the process described above, the content data 191 in the HDD 19 enters a state where playback is permitted. Since the content data 191 is the original data before reducing the bit rate for recording on the memory card 21a, even after a move is performed, the video content can be played back by the video recorder 1 without degrading its quality. Similarly, for example, when video content is moved from the video recorder 1 to the portable terminal 2, further moved to other apparatuses or recording media a plurality of times, and then returned to the video recorder 1, the video content with the original quality can be played back. Furthermore, when video content once moved is returned to the video recorder 1, since the data of the video content itself need not be transferred, the time needed for the move is reduced.

Next, processes executed by the video recorder 1 when video content is recorded and moved will be described in further detail.

Figure 4:
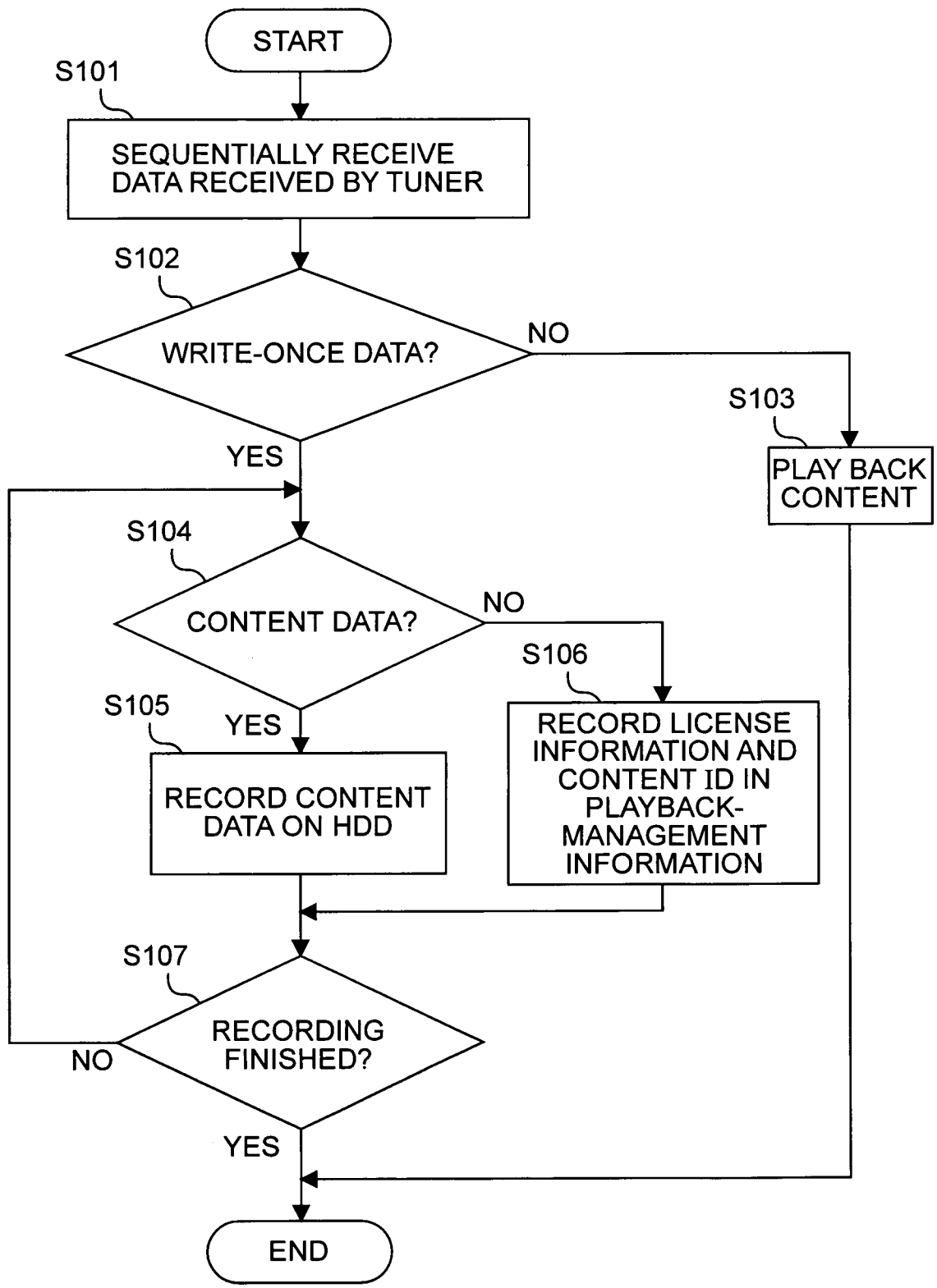
FIG. 4 is a flowchart showing the flow of a process executed when video content received through broadcasting is recorded on an HDD.

FIG. 4 is a flowchart showing the flow of a process for recording video content, for example, received through broadcasting, on the HDD 19.

Step S101:

The tuner 11 sequentially receives broadcasting content, and the CPU 15 sequentially receives data output from the tuner 11.

Step S102:

Copy control information is extracted from the data received. The process then proceeds to step S104 when the data permits recording only once, while the process proceeds to step S103 when the data does not permit recording.

Step S103:

The data of the video content received is fed to and decoded by the encoder/decoder 12, whereby the content is played back and output. At this time, the data of the content is not recorded on a recording medium.

Step S104:

The process proceeds to step S105 when the data fed from the tuner 11 is data of video content that is to be recorded, while the process otherwise (when the data is license information herein) process to step S106.

Step S105:

The data of the video content is recorded on the HDD 19. Actually, the data of the video content is encrypted by the cryptographic processing circuit 23 before it is recorded on the HDD 19. At this time, for example, a device ID uniquely assigned to the HDD 19 is used as encryption-key data.

Step S106:

License information and a content ID are recorded in association with each other in the playback-permission area 181a of the playback-management information 181 in the non-volatile memory 18. When no content ID is attached in advance to video content recorded, a unique content ID is generated and recorded. The license information may be encrypted by the cryptographic processing circuit 23 before it is registered in the playback-management information 181.

Step S107:

It is determined whether to exit the recording process. When the recording process is not to be exited, the process returns to step S104.

Through the process described above, regarding video content that can be moved, the content ID and license information thereof are registered in the playback-permission area 181a of the playback-management information 181. Furthermore, by managing the license information separately from the data of the video content, the license information need not be separated from or joined with the data of the video content each time when it is moved to another recording medium or when it is moved back from another recording medium. This serves to improve the efficiency of processing.

Figure 5:
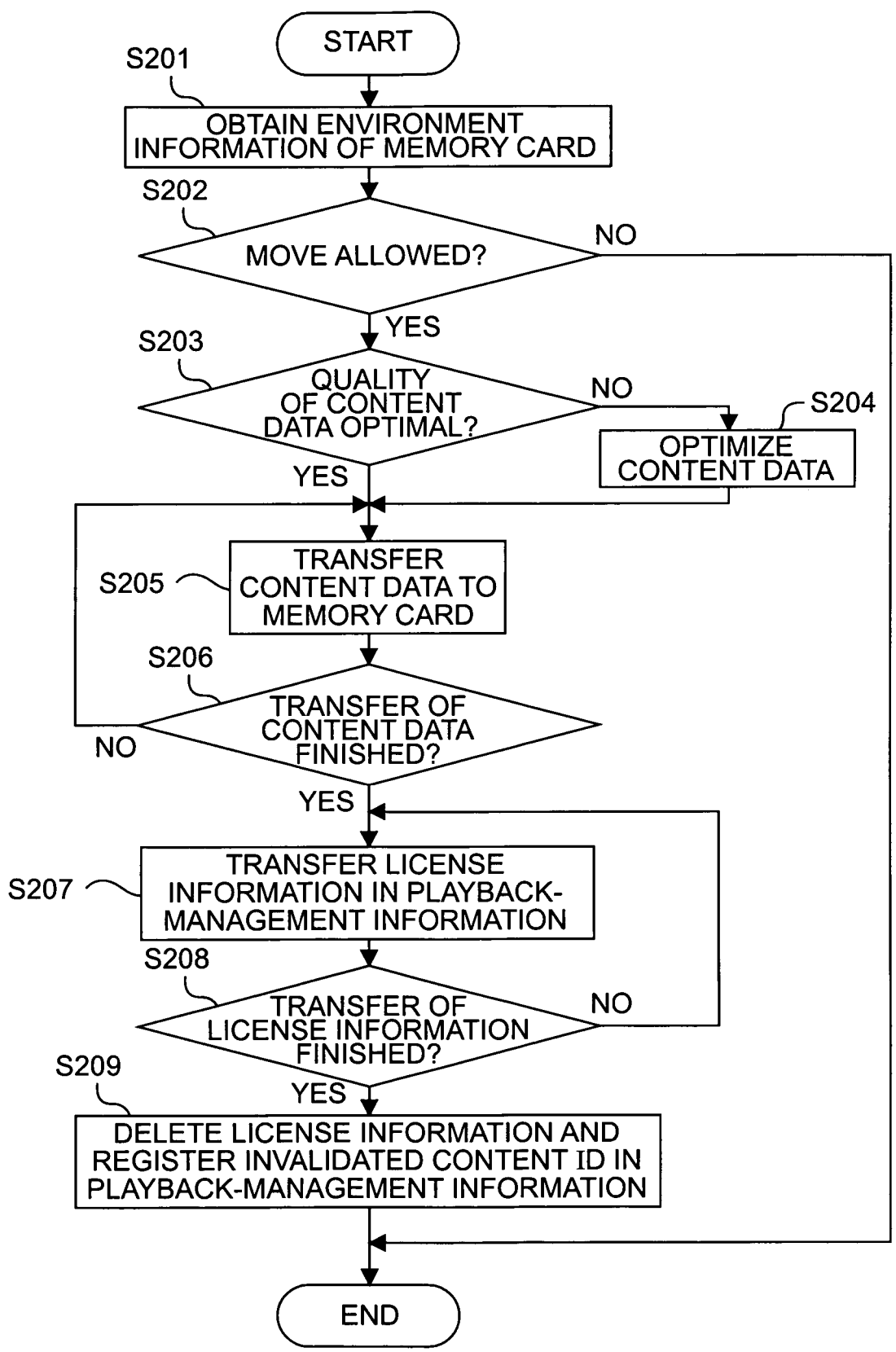
FIG. 5 is a flowchart showing the flow of a process executed when video content in the HDD is moved to a memory card.

FIG. 5 is a flowchart showing the flow of a process executed when video content in the HDD 19 is moved to the memory card 21a.

Step S201:

When an instruction for moving video content in the HDD 19 to the memory card 21a is issued, for example, by an operation input by the user via the input I/F 22, the CPU 15 first obtains environment information recorded on the memory card 21a attached to the memory-card I/F 21. As the environment information, for example, the storage capacity or the remaining capacity of the memory card 21a, the type of an application program used for playback, the type of an apparatus used for playback, formats of data that can be played back by the apparatus, image resolution, and so forth can be used.

Step S202:

Copy control information assigned to the video content to be moved from the HDD 19 is extracted, and it is determined whether the data permits moving. The process proceeds to step S203 when the data permits moving, while the process is exited when the data does not permit moving.

Step S203:

Based on the environment information obtained in step S201, it is determined whether the quality of the video content to be moved, such as the bit rate or the data volume, is appropriate for recording on the memory card 21a. The process proceeds to step S204 when the quality is not appropriate, while the process proceeds to step S205 when the quality is appropriate.

Step S204:

The video content to be moved is optimized for recording on the memory card 21a. More specifically, under the control of the CPU 15, the data of the video content read from the HDD 19 is decrypted by the cryptographic processing circuit 23, then once decoded by the encoder/decoder 12, and then re-encoded so as to reduce the bit rate.

Step S205:

The data of the video content in the HDD 19 (or the re-encoded data) is transferred to the memory card 21a. At this time, the data is actually encrypted by the cryptographic processing circuit 23 before it is recorded on the memory card 21a. At this time, for example, an ID uniquely assigned to the memory card 21a is used as an encryption key. Furthermore, as a part of the encryption key, or as data for generating the encryption key, license information associated with the video content, or a part of the license information, may be used.

Step S206:

It is determined whether the transfer of the data of the video content has been finished. The process returns to step S205 when the transfer has not been finished, while the process proceeds to step S207 when the transfer has been finished.

Step S207:

With reference to the playback-management information 181 in the non-volatile memory 18, the associated license information in the playback-permission area 181a is read and transferred to the memory card 21a. At this time, similarly to the data of the video content, the license information may also be encrypted by the cryptographic processing circuit 23 before it is recorded on the memory card 21a.

Step S208:

It is determined whether the transfer of the license information has been finished. The process returns to step S207 when the transfer has not been finished, while the process proceeds to step S209 when the transfer has been finished.
Step S209:

The associated license information recorded in the playback-permission area 181a of the playback-management information 181 is deleted, and the content ID of the video content moved is registered in the playback-prohibition area 181b.

Through the process described above, the video content in the HDD 19 is virtually moved to the memory card 21a without deleting the data.

In the process described above, before transferring the data of the video content to the memory card 21a, a query may be issued as to whether data of video content having the same content ID is already recorded in the memory card 21a, transferring only the license information when the data is already recorded. Accordingly, for example, when video content exist that has once been virtually moved to the memory card 21a and then virtually moved back to the HDD 19 (i.e., only license information has been moved without deleting the data of the video content in the memory card 21a) in the past, the data of the video content need not be transferred again to the memory card 21a.

Figure 6:
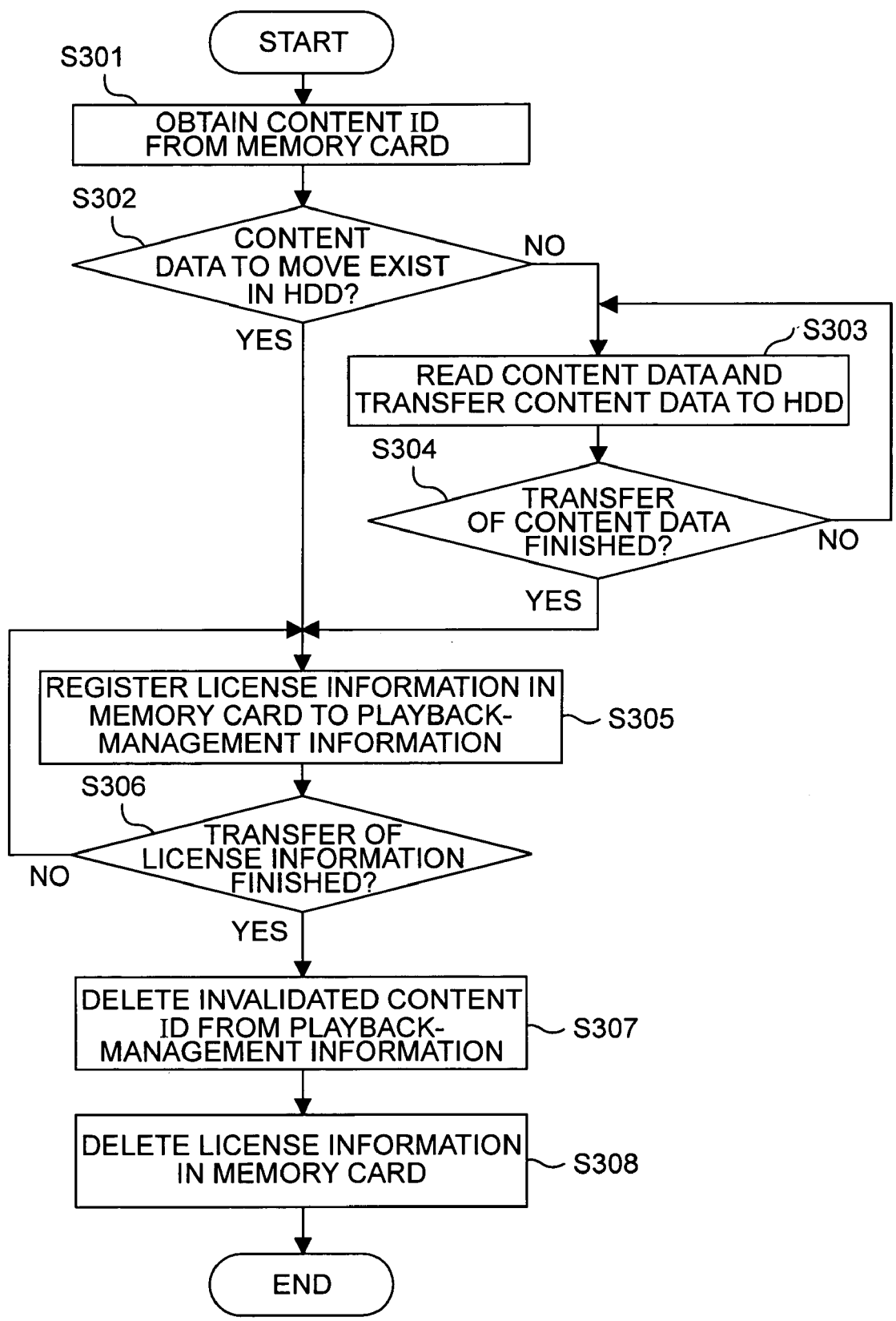
FIG. 6 is a flowchart of a process executed when video content that has been moved in the past is moved back from the memory card to the HDD.

FIG. 6 is a flowchart showing the flow of a process executed when video content that has been moved in the past is moved back from the memory card 21a to the HDD 19.
Step S301:

When an instruction for moving certain video content in the memory card 21a to the HDD 19 is issued, for example, by an operation input by the user via the input I/F 22, the CPU 15 obtains the content ID of the specified video content from the memory card 21a.
Step S302:

It is determined whether data of the video content to be moved exists in the HDD 19. More specifically, with reference to the playback-management information 181 in the non-volatile memory 18, it is determined whether the content ID obtained in step S301 exists in the playback-prohibition area 181b. The process proceeds to step S305 when the content ID exits, while the process proceeds to step S303 when the content ID does not exist.
Step S303:

The data of the video content to be moved is read from the memory card 21a and transferred to the HDD 19. Actually, the data is decrypted using, for example, license information recorded in the memory card 21a or an ID unique to the memory card 21a as a decryption key, and is encrypted using, for example, license information or a device ID unique to the HDD 19 as an encryption key, before it is recorded on the HDD 19.
Step S304:

It is determined whether the transfer of the data of the video content has been finished. The process returns to step S303 when the transfer has not been finished, while the process proceeds to step S305 when the transfer has been finished.
Step S305:

The license information associated with the video content to be moved is read from the memory card 21a and transferred to the non-volatile memory 18, and the license information is registered in the playback-permission area 181a of the playback-management information 181 together with the content ID. When the license information in the memory card 21a is encrypted, the license information is decrypted, and may be then encrypted similarly to the data of the video content before it is registered in the playback-management information 181.

Step S306:

It is determined whether the transfer of the license information has been finished. The process returns to step S305 when the transfer has not been finished, while the process proceeds to step S307 when the transfer has been finished.
Step S307:

When the content ID representing the video content to be moved exists in the playback-prohibition area 181b of the playback-management information 181 (i.e., when step S302 results in "Yes"), the content ID is deleted.
Step S308:

The license information in the memory card 21a, which has been transferred, is deleted. Furthermore, the data of the video content in the memory card 21a, which has been moved, may also be deleted.

When the video content that has been virtually moved to the memory card 21a is moved back by the process described above, the instruction is recognized based on the content ID in the playback-prohibition area 181b of the playback-management information 181, and only the associated license information is transferred to the HDD 19, whereby the move operation is completed. In this case, the time needed for the move is reduced, which improves convenience for the user. Furthermore, degradation in the quality of the video content due to the move can be avoided.

The process described above can be executed similarly by the video recorder 1 in the case of, for example, a move between the optical disk 20a and the memory card 21a or a move between the HDD 19 and the optical disk 20a. Furthermore, also in the case of a move between the HDD 19 and the optical disk 20a, it is possible to execute re-encoding (change the bit rate) by the encoder/decoder 12. Also in this case, degradation in the quality of video content due to the move can be avoided.

Furthermore, the process described above can be applied to the case of a move from the video recorder 1 to another apparatus via a wired or wireless communication I/F. Furthermore, in this case, a function of controlling move operations based on the playback-management information as described above may provided in both of the apparatuses connected.

For example, referring to FIGS. 3A and 3B, when the video recorder 1 is connected to the portable terminal 2 via a communication I/F such as a USB (Universal Serial Bus) I/F and both apparatuses have the function of controlling move operations based on the playback-management information as described above, as shown in FIG. 3A, when video content in the video recorder 1 is moved to the portable terminal 2, license information moved is registered in playback-management information in the portable terminal 2. As shown in FIG. 3B, when the video content is moved from the portable terminal 2 to the video recorder 1, a virtual move is executed without deleting the data of the video content itself in the portable terminal 2.

Thus, when the same video content is subsequently moved between the video recorder 1 and the portable terminal 2, the data of the video content itself is not transferred, and only the license information (and the content ID) is transferred. For example, an apparatus at the move source, when it is recognized that the video content to be moved permits moving (corresponding to step S202 in FIG. 5), sends the content ID to an apparatus at the move destination of the content ID of the video content to ask whether corresponding data is recorded in the apparatus at the move destination. In response to the query, the apparatus at the move destination starts a process corresponding to FIG. 6. When the corresponding data exists (corresponding to step S302 in FIG. 6), the apparatus notifies the apparatus at the move source that the corresponding data exists. Thus, the apparatus at the move source suffices to transfer only the license information (corresponding to step S207 in FIG. 5). Accordingly, the data transfer time is reduced, which serves to improve convenience for the user.

Since the video content is recorded in each of the apparatuses with the bit rate optimized for the apparatus, in addition to the advantage of maintaining the quality of the original data, advantageously, it is possible to readily play back the data optimized for each of the apparatuses simply by transferring the license information.

Since a memory controlling circuit is included in a memory card, it is possible to add to the control circuit the function of controlling move operations based on the playback-management information as described above.

Second Embodiment

As described above, in a move operation of digital content, by transferring only license information without transferring the data of the digital content itself, it is possible to improve convenience for the user to some extent without degrading the quality of the data of the digital content. However, when the digital content is to be played back, the user has to be constantly aware of whether data of the digital content recorded on a playback apparatus can be currently played back or is invalidated.

Particularly, under a situation where an individual person plays back digital content using a large number of playback apparatuses, such as portable players, when each of the apparatuses has the function of allowing virtual move operations as described earlier, it is not easy for the user to be constantly aware of whether which playback apparatus is currently allowed to play back desired digital content. This causes a problem of inconvenience.

Thus, in a second embodiment described below, when playback of certain digital content is prohibited to allow a virtual move operation, an external management module exercises management so that playback permission for the digital content is temporarily assigned only to a single playback apparatus. Then, by accessing the management module from each playback apparatus or by accessing the playback apparatus from the management module, playback of the digital content by the playback apparatus is allowed.

Thus, for example, when each playback apparatus and the management module execute short-range wireless communication, the management module is disposed within a range where wireless communication with the playback apparatus is allowed. When communication is executed via a wired cable, the playback apparatus is connected to the management module via a communication cable, a connector, or the like, whereby playback of digital content is allowed. As described above, the problem described above can be solved by providing a management module in the proximity of a playback apparatus used and managing by the management module digital content that can be currently played back.

Figure 7:
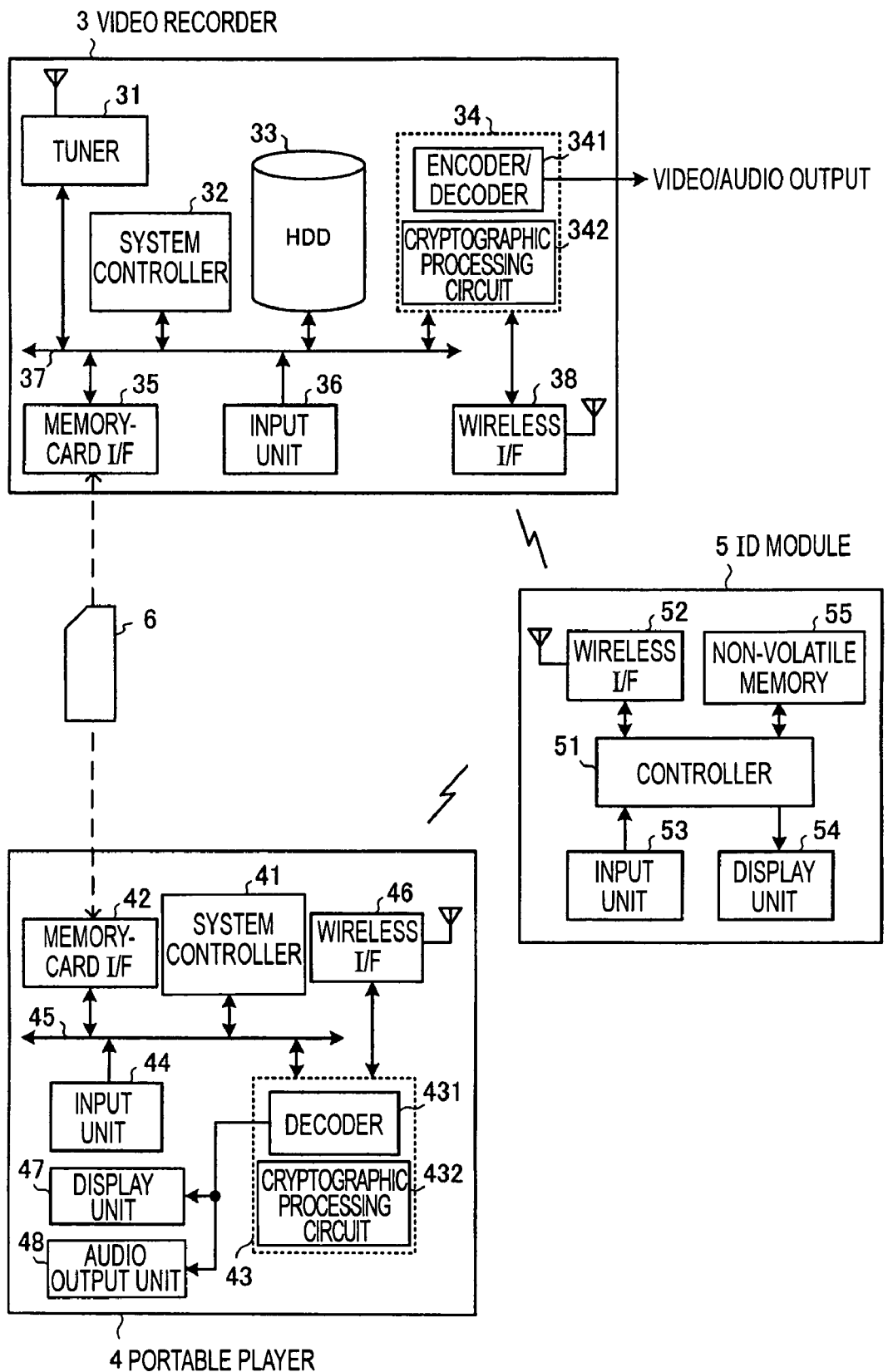
FIG. 7 is a diagram showing the construction of a content playback system according to a second embodiment of the present invention.

FIG. 7 is a diagram showing the configuration of a content playback system according to this embodiment.

The content playback system shown in FIG. 7 includes a video recorder 3 and a portable player 4 as examples of apparatuses for playing back video content, and an ID module 5 that manages playback status of video content in the playback apparatuses. Similarly to the video recorder 1 described in the context of the first embodiment, the video recorder 3 has a function of recording and playing back broadcasting content received through digital broadcasting, and a function of copying (or moving) recorded broadcasting content to a memory card 6. The portable player 4 uses the memory card 6 as a recording medium, and has a function of playing back video content recorded on the memory card 6.

Furthermore, in this embodiment, for example, the ID module 5 is capable of executing wireless communication based on a short-range communication protocol (e.g., Bluetooth) with the video recorder 3 and the portable player 4. Alternatively, these apparatuses may execute wired communication based on a communication protocol such as USB.

The video recorder 3 includes a tuner 31, a system controller 32, an HDD 33, a recording/playback engine chip 34, a memory-card I/F 35, and an input unit 36, these components being connected to each other via an internal bus 37. Furthermore, the recording/playback engine chip 34 is connected to a wireless I/F 38.

The tuner 31 receives digital broadcasting, and outputs onto the internal bus 37 data of broadcasting content of a program specified by the system controller 32, or additional data such as copy control information or data broadcasting. The system controller 32 includes a CPU, a ROM, a RAM, and so forth, and it exercises overall control on the components of the video recorder 3. On the HDD 33, data of video content, various types of programs, data, and the like are recorded. On the HDD 33, broadcasting content or various types of data received by the tuner 31, video content read from the memory card 6 via the memory-card I/F 35, and so forth can also be recorded.

The recording/playback engine chip 34 is a processing block that executes part of processing when video content is recorded, played back, copied, or moved. The recording/playback engine chip 34 includes an encoder/decoder 341 for video data and audio data, a cryptographic processing circuit 342 that executes cryptographic processing in recording, playback, move, or other operations, and so forth. Furthermore, although not shown, the recording/playback engine chip 34 may have a function of controlling communication with the ID module 5 via the wireless I/F 38.

The memory-card I/F 35 reads data from and writes data to the memory card 6. The input unit 36 includes a photoreceptor for receiving infrared signals from a remote controller, various operation keys, an I/F circuit for the operation keys, and so forth. The input unit 36 outputs control signals in accordance with input operations by the user onto the internal bus 37.

The wireless I/F 38 is a processing block for executing wireless communication with the ID module 5. The wireless I/F 38 includes processing circuits for modulating and demodulating data, creating and separating packets, executing mutual authentication with a party in communication, and so forth.

In the video recorder 3, for example, data of broadcasting content (video content) received by the tuner 31 can be recorded on the HDD 33. Furthermore, video content recorded on the HDD 33 or the memory card 6 can be played back by decoding the data of the video content by the encoder/decoder 341, converting the decoded data into video signals and audio signals for output, and outputting the video signals and audio signals to an external television receiver or the like.

Furthermore, copyrighted video content (with copy control information specifying "copy once") can be moved between the HDD 33 and the memory card 6. At this time, by a process described later, a virtual move is allowed without deleting the data of the original video content. When video content that has been virtually moved is to be played back, wireless communication with the ID module 5 via the wireless I/F 38 is needed.

The portable player 6 includes a system controller 41, a memory-card I/F 42, a playback engine chip 43, and an input unit 44, these components being connected to each other via an internal bus 45. Furthermore, the playback engine chip 43 is connected to a wireless I/F 46, a display unit 47, and an audio output unit 48.

The system controller 41 includes a CPU, a ROM, a RAM, and so forth, and it exercises overall control on the components of the portable player 4. The memory-card I/F 42 reads data from and writes data to the memory card 6. The playback engine chip 43 includes a decoder 431 for video data and audio data, a cryptographic processing circuit 432 that executes cryptographic processing in playback, move, or other operations, and so forth. The playback engine chip 43 executes part of processing when video content is played back, copied, or moved. Furthermore, although not shown, the playback engine chip 43 may have a function of controlling communication with the ID module 5 via the wireless I/F 46.

The input unit 44 includes various operation keys, an I/F circuit for the operation keys, and so forth. The input unit 44 outputs control signals in accordance with input operations by the user onto the internal bus 45.

The wireless I/F 46 is a processing block for executing wireless communication with the ID module 5. The wireless I/F 46 includes processing circuits for modulating and demodulating data, creating and separating packets, executing mutual authentication with a party in communication, and so forth.

The display unit 47 includes a display device such as an LCD (Liquid Crystal Display), a display processing circuit, and so forth. The display unit 47 receives video data decoded by the decoder 431, and plays back and displays the video content on the display device. The audio output unit 48 includes a speaker or earphone output terminal, an audio processing circuit such as an amp, and so forth. The audio output unit 48 receives audio data decoded by the decoder 431, and outputs sound played back based on the data.

In the portable player 4, video content recorded on the memory card 6 can be played back by decoding the data of the video content by the decoder 431 and feeding the decoded data to the display unit 47 and the audio output unit 48. Also, video content that has been virtually moved can be played back. For this purpose, wireless communication is executed with the ID module 5 via the wireless I/F 46.

In the playback apparatus described above, copyrighted video content is encrypted when it is recorded on the HDD 33 or the memory card 6. In the video recorder 3, processing for the encryption is executed by the cryptographic processing circuit 342. At the time of playback, the video content is read from these recording media and then decrypted by the cryptographic processing circuit 342. In the portable player 4, video content in the memory card 6 can be played back by decrypting the video content by the cryptographic processing circuit 432. In these apparatuses, the cryptographic processing circuit 342 and the cryptographic processing circuit 432 also execute encryption of license information attached to video content, and encryption of data exchanged with the ID module 5.

The ID module 5 includes a controller 51, a wireless I/F 52, an input unit 53, a display unit 54, and a non-volatile memory 55. The controller 51 includes a CPU, a ROM, a RAM, a cryptographic processing circuit, and so forth, and it exercises overall control on the components of the ID module 5. The wireless I/F 52 is a processing block for executing wireless communication with playback apparatuses, such as the video recorder 3 and the portable player 4. The wireless I/F 52 includes processing circuits for modulating and demodulating data, creating and separating packets, executing mutual authentication with a party in communication, and so forth.

The input unit 53 includes various operation keys, an I/F circuit for the operation keys, and so forth. The input unit 53 supplies control signals in accordance with input operations by the user to the controller 51. The display unit 54 includes a display device such as an LCD, a display processing circuit, and so forth. The display unit 54 displays an image based on an image signal generated by the controller 51. The non-volatile memory 55 is implemented, for example, by an EEPROM. As will be described later, the non-volatile memory 55 stores list information for managing current playback status of video content that has been virtually moved in a playback apparatus.

In this content playback system, video content in a playback apparatus, such as the video recorder 3 or the portable player 4, cannot be played back unless temporary playback permission is received from the ID module 5. Hereinafter, such video content that is prohibited from playback will be referred to as a "virtual move target". The ID module 5 accepts requests for registration or deregistration of virtual move targets, requests for starting or stopping playback, and so forth from playback apparatuses via the wireless I/F 52, and updates the list information recorded on the non-volatile memory 55 according to these requests, thereby managing playback status thereof. Even when video content of a virtual move target is copied to another playback apparatus based on the list information in the ID module 5, playback permission is assigned to only a single playback apparatus. Thus, the effect of copyright protection that is substantially equivalent to that in the case of a move can be achieved without deleting the data of the video content in each playback apparatus.

Now, two examples processes for implementing a virtual move operation in the content playback system configured as described above will be described.

First Example Process

Figure 8:
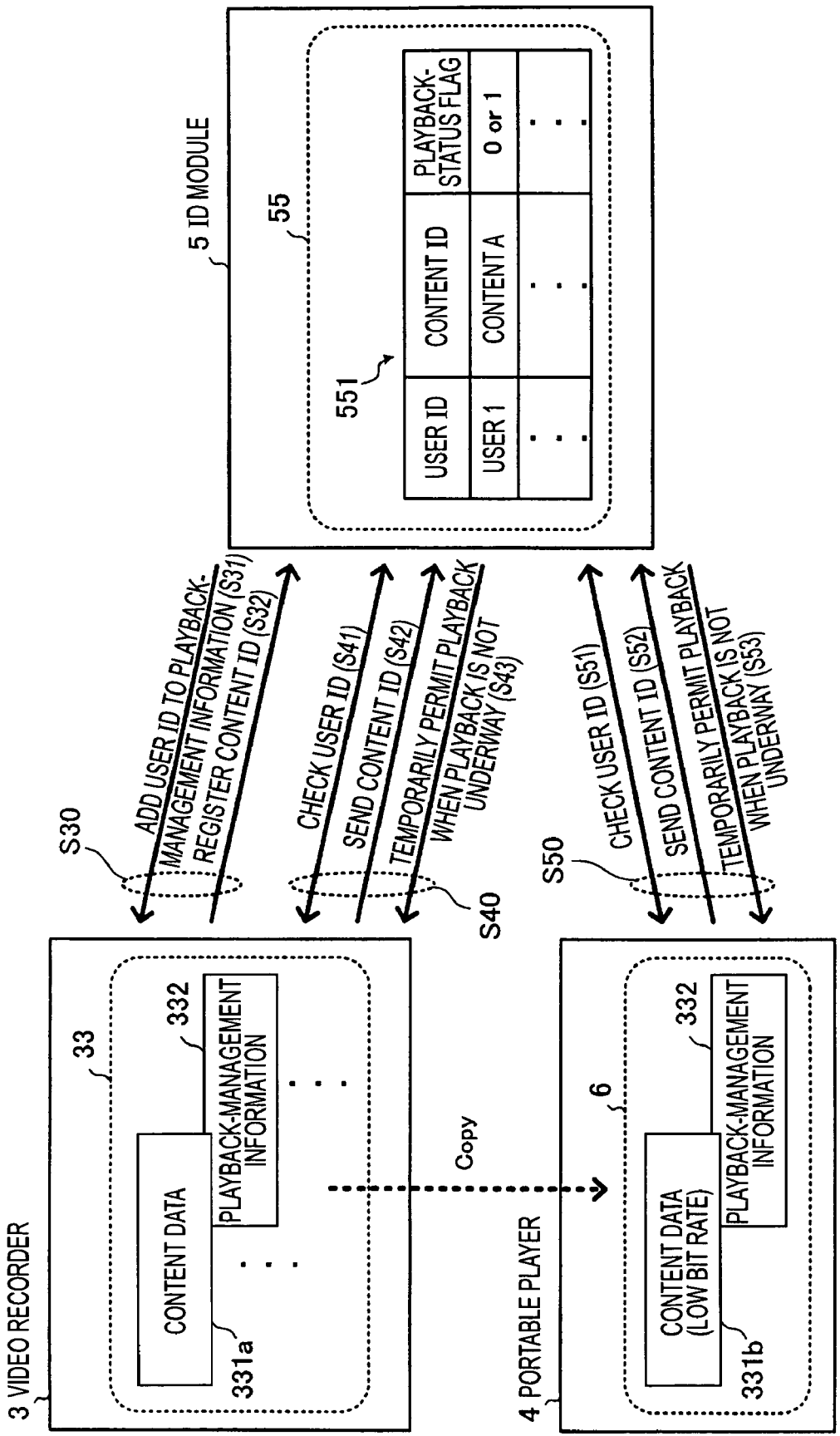
FIG. 8 is a diagram showing the scheme of a move operation in the content playback system according to a first example process in the second embodiment of the present invention.

FIG. 8 is a diagram showing the scheme of a move operation in the content playback system according to a first example process.

In the first example process, when video content in a playback apparatus is selected as a virtual move target, a content ID identifying the video content is registered in the ID module 5. Thus, by deleting the content ID in the ID module 5, the video content can be readily deregistered from the state of the virtual move target.

As shown in FIG. 8, in order to execute a virtual move operation in the content playback system, first, a step of registering video content in the video recorder 3 as a virtual move target (step S30) is executed, whereby each playback apparatus (the video recorder 3 and the portable player 4 herein) is allowed to obtain temporary playback permission from the ID module 5 and play back the virtual move target (steps S40 and S50). Furthermore, although not shown, the video content can be deregistered from the virtual move target and returned to the original state.

In the non-volatile memory 55 of the ID module 5, a playback-status management list 551 for managing playback status of video content selected as virtual move targets in playback apparatuses is recorded. In the playback-status management list 551, content IDs for identifying video content selected as virtual move targets and playback-status flag indicating whether the video content is currently being played back by a single playback apparatus are associated with a user ID for identifying a user.

The user ID may be assigned for each ID module 5 in advance. In this case, the user ID is equivalent to a module ID for identifying the ID module 5. For example, when users who need to move video content individually use the users' own ID modules 5, such assignment of user IDs is easy to grasp. Conversely, for example, when a single ID module 5 is used by a plurality of users, a user ID is generated on each operation for registering a virtual move target. Furthermore, in either case, a plurality of content IDs may be registered for a single user ID. In that case, playback-status flags may be individually provided for the respective content IDs.

When data of video content received through broadcasting (content data 331*a*) is recorded on the HDD 33 in the video recorder 3, as shown in FIG. 8, the procedure for registering the content data 331*a* as a virtual move target mainly includes a step of adding a user ID assigned by the ID module 5 to playback-management information 332 associated with the content data 331*a* selected as the virtual move target (step S31), and a step of registering a content ID representing the content data 331*a* of the virtual move target in the playback-status management list 551 of the ID module 5 (step S32).

The playback-management information 332 serves to add a condition for playback that playback of the associated content data 331*a* is prohibited unless temporary playback permission is obtained from the ID module 5, and a user ID is recorded to allow connection with an appropriate ID module 5 at the time of playback. The playback-management information 332 is implemented, for example, as a part of license information for permitting playback of the content data 331*a*. Furthermore, a user ID or information related thereto may be used as an encryption key for encrypting the content data 331*a* or as a part of the encryption key when registering a virtual move target.

In this embodiment, the playback-management information 332 is provided for each piece of video content, and is attached integrally to the data of the video content. Alternatively, for example, a plurality of pieces of video content in a recording medium may be managed together based on a single piece of playback-management information.

Figure 9:
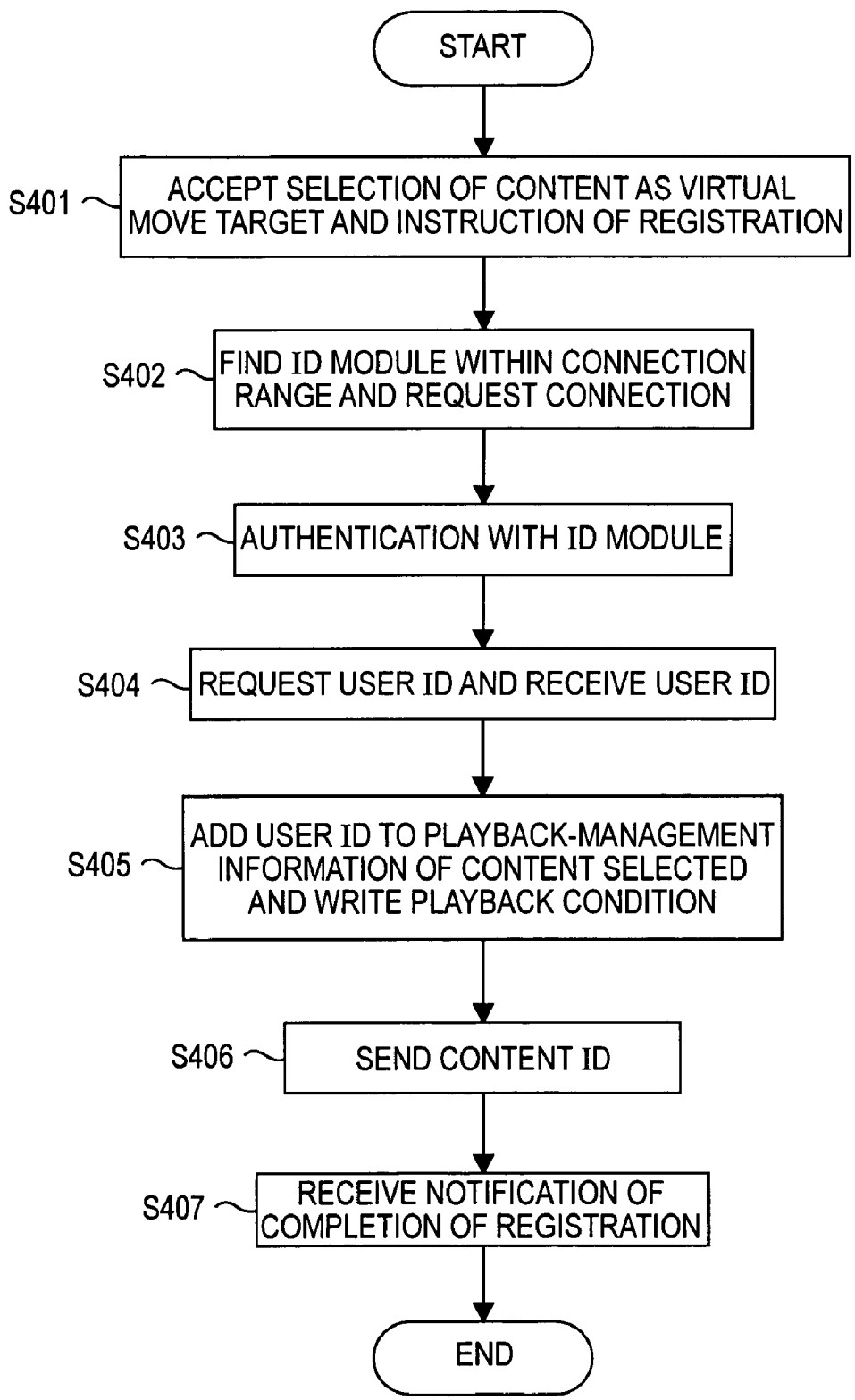
FIG. 9 is a flowchart showing the flow of a process executed by a video recorder when a virtual move target is registered.

A virtual move target is registered in accordance with an operation input by the user at the video recorder 3 or the ID module 5. In FIG. 9 described below, as an example, a process executed when a virtual move target is registered in accordance with an operation input at the video recorder 3 will be described.

FIG. 9 is a flowchart showing the flow of a process executed by the video recorder 3 when a virtual move target is registered.

Step S401:

By an input operation by the user from the input unit 36, selection of a virtual move target from among video content recorded on the HDD 33 is accepted, and an instruction for starting registration is input. In response to the input, the system controller 32 activates a program for registering a virtual move target, and executes the process described below.

Step S402:

An ID module 5 that exists within a connectable range is searched for via the wireless I/F 38, and connection is requested to the ID module 5 found by the searching.

Step S403:

The wireless I/F 38 executes mutual authentication with the ID module 5 in connection.

Step S404:

When the mutual authentication succeeds, a wireless communication link is established with the ID module 5. Then, a request for sending a user ID is issued, and the user ID is received.

Step S405:

The user ID received from the ID module 5 is added to the playback-management information 332 associated with the video content selected in step S401, and a playback condition specifying that playback is prohibited unless playback permission is received from the ID module 5 is written to the playback-management information 332. Thus, the video content with the user ID attached becomes a virtual move target.

At this time, the user ID or information related thereto may be included as an encryption key or a part of the encryption key to encrypt data of the video content. Furthermore, when the data of the video content is already encrypted using, for example, the device ID of the HDD 33, the data of the video content is once decrypted through processing by the cryptographic processing circuit 342, and is encrypted again using the user ID or the like as key information.

Step S406:

The content ID of the video content with the user ID attached is sent to the ID module 5. Upon receiving the content ID from the video recorder 3, the ID module 5 registers the ID in association with the associated user ID in the playback-status management list 551. Furthermore, the ID module 5 sets the associated playback-status flag to "0", and then notifies the video recorder 3 of the completion of the registration.

Step S407:

The notification of the completion of the registration from the ID module 5 is received, and the process of registering a virtual move target is exited.

To prohibit playback of video content selected as a virtual move target, key information used to encrypt data of the video content in step S405, or a part of the key information, may be recorded in the playback-status management list 551 of the ID module 5 alone. This serves to improve the confidentiality of the video content selected as the virtual move target.

When a plurality of ID module is found by the searching in step S402, the video recorder 3 may display icons representing the respective ID modules and prompt the user to select one of the ID modules. In this case, when authentication does not succeed in step S403, another ID module found by the searching may be automatically accessed to execute authentication again.

Referring back to FIG. 8, the content data 331*a* selected as a virtual move target by the procedure described above with reference to FIG. 9 can be freely copied to another recording medium together with the playback-management information 332 attached thereto (i.e., with the user ID attached to the content data 331*a*). This is because playback of the content data 331*a* is prohibited unless playback permission is assigned by the ID module 5. Referring to FIG. 8, the content data 331*a* and the playback-management information 332 are copied to the memory card 6 so that the video content can be played back by attaching the memory card 6 to the portable player 4. Alternatively, the content data 331*a* and the playback-management information 332 may be automatically copied from the video recorder 3 to another recording medium without a particular operation by the user. In this case, the convenience for the user is further improved.

Usually, when the content data 331*a* in the HDD 33 of the video recorder 3 is recorded on the memory card 6, the bit rate and volume of the content data 331*a* are reduced before it is recorded on the memory card 6, for example, by reducing the image resolution through processing by the encoder/decoder 34 (in FIG. 8, content data 331*b* has a reduced bit rate).

Furthermore, in the video recorder 3 and the portable player 4, the user ID may be separately recorded, for example, in a non-volatile memory in the apparatus. This is suitable when, for example, a single user exclusively uses a particular playback apparatus. In this case, video content that is played back by the particular playback apparatus is all selected as virtual move targets using the same ID module 5. This can be applied, for example, to a portable player including an irremovable HDD or the like as a recording medium for video content.

According to this method, when video content selected as a virtual move target is copied to the portable player including the non-volatile memory, incorrect copying of video content with a different user ID attached thereto can be prevented. Furthermore, it is possible to implement a function of allowing the portable player to automatically copy video content with a target user ID attached thereto among video content recorded on another recording medium (or playback apparatus) and selected as virtual move targets.

When the content data 331a in the video recorder 3 is played back (step S40), after establishing a wireless communication channel between the video recorder 3 and the ID module 5, a user ID held by the ID module 5 is compared with a user ID recorded in the playback-management information 332 associated with the content data 331a (step S41).

When these user IDs match, the video recorder 3 sends the content ID of the content data 331a to the ID module 5 (step S42). The ID module 5, with reference to the playback-status management list 551, assigns temporary playback permission to the video recorder 3 when the playback-status flag associated with the content ID received indicates "0" (step S43). At this time, the ID module 5 sets the associated playback-status flag in the playback-status management list 551 to "1".

The video recorder 3 with the playback permission assigned by the procedure described above is allowed to playback the content data 331a. The playback permission is assigned temporarily, and the video recorder 3 is allowed to continue playback, for example, by subsequently receiving playback permission at predetermined time intervals from the ID module 5.

The content data 331b in the memory card 6 can be played back by the portable player 4 by a similar procedure (step S50). That is, a user ID held by the ID module 5 is compared with a user ID recorded in the playback-management information 332 (step S51). When these user IDs match, the content ID is sent to the ID module 5 (step S52). The ID module 5 assigns temporary playback permission to the portable player 4 only when the playback-status flag associated with the content ID received indicates "0" (step S53).

The ID module 5, using the playback-status flag in the playback-status management list 551, permits only a single playback apparatus to play back the content data, whereby a move operation is virtually implemented. Furthermore, in the video recorder 3, even after the video content selected as a virtual move target has been copied to the memory card 6, the original content data 331a in the HDD 33 before reducing the bit rate can be played back, so that degradation in the quality of the video content due to the move operation can be avoided.

For example, in order to once move content recorded on the video recorder 3 to the portable player 4 and play back the content and then allow playback by the video recorder 3 again, it has been the case to move the content data a plurality of times. In the content playback system according to this embodiment, a plurality of moves is substantially implemented by a single move of actual content data and management of playback permission by the ID module 5. Thus, advantageously, degradation of content data, which has hitherto been unavoidable when moves are repeated as described above, can be avoided.

Now, a process that is executed when a virtual move target is played back will be described more specifically.

Figure 10:
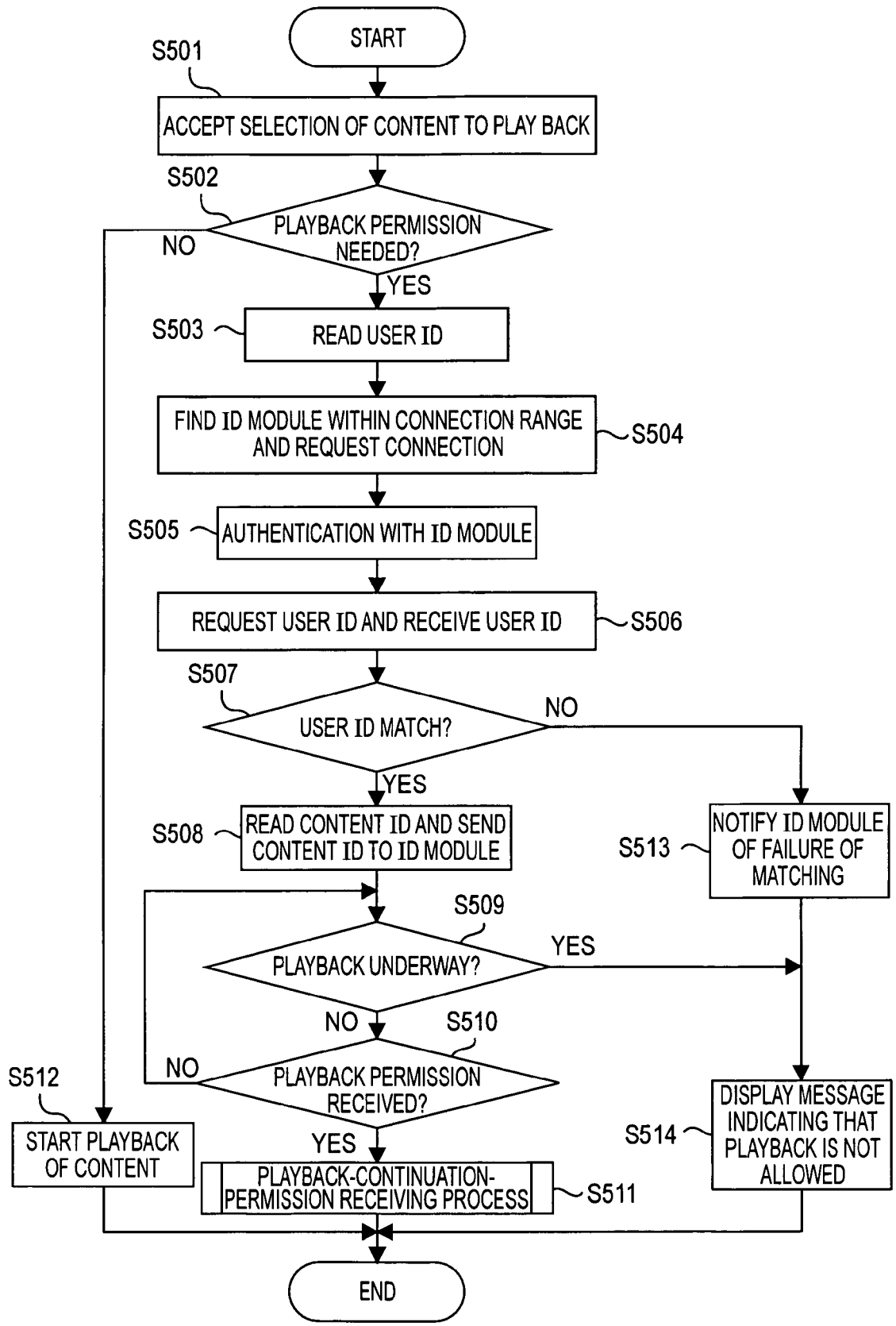
FIG. 10 is a flowchart showing the flow of a process executed by the video recorder when the virtual move target is played back according to user's operations at the video recorder.

FIG. 10 is a flowchart showing the flow of a process executed by the video recorder 3 when a virtual move target is played back according to user's operations at the video recorder 3.

Step S501:
According to an operation input by the user via the input unit 36, selection of video content to play back is accepted.

Step S502:
With reference to a playback condition described in the playback-management information 332 associated with the video content selected, it is determined whether playback permission from the ID module 5 is needed. The process proceeds to step S503 when playback permission is needed, while the process proceeds to step S512 when playback permission is not needed.

Step S503:
A user ID is read from the playback-management information 332 associated with the video content selected.

Step S504:
An ID module 5 that exists within a connectable range is searched for via the wireless I/F 38, and connection is requested to the ID module 5 found by the searching.

Step S505:
The wireless I/F 38 executes mutual authentication with the ID module 5 in connection.

Step S506:
When the mutual authentication succeeds, a wireless communication link with the ID module 5 is established. Then, a request for sending a user ID is issued, and the user ID is received.

Step S507:
The user ID received is compared with the user ID read in step S503. When these user IDs match, the process proceeds to step S508. When the user IDs do not match, the process proceeds to step S513.

Step S508:
The content ID of the video content with the matching user ID is read, and is sent to the ID module 5.

Step S509:
Responses from the ID module 5 are monitored. The process proceeds to step S514. When a notification is received that the video content associated with the content ID sent in step S508 is being played back by another playback apparatus, while the process otherwise proceeds to step S510.

Step S510:
The process proceeds to step S511. When temporary playback permission is received from the ID module 5. Otherwise, the process returns to step S509, in which responses from the ID module 5 are monitored.

Step S511:
In response to the playback permission from the ID module 5, for example, the video content is decrypted by the cryptographic processing circuit 342, decoded by the encoder/decoder 341, and playback of the video content is started. Then, playback is continued by successively receiving playback permission. Step S511 will be described later with reference to FIG. 12.

Step S512:
When the video content does not require playback permission from the ID module 5, the video content is simply played back. For example, the video content is decrypted using key information in the playback-management information 332, and is decoded by the encoder/decoder 34i. Although not shown, the playback is continued until the user instructs by an operation input that the playback be stopped.

Step S513:
When the matching of user IDs fails, the ID module 5 is notified of the failure. The process then proceeds to step S514.
Step S514:
The user is notified that playback is not allowed by a message displayed on a display screen of a television apparatus connected. The process is then exited. In this case, for example, the user may connect by wireless to another ID module and request playback permission again.

It is possible to play back video content in the memory card 6 by a similar process.

Figure 11:
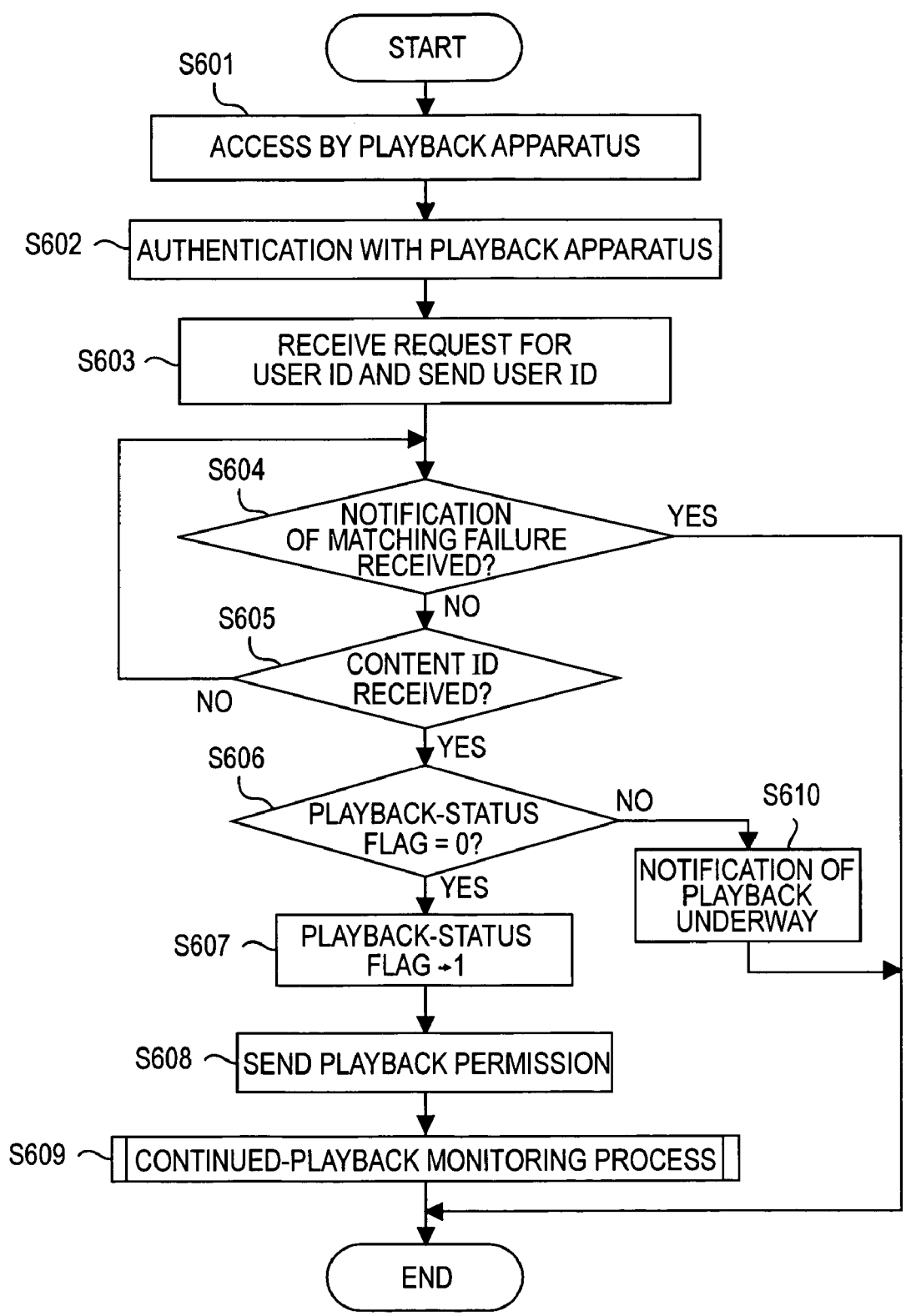
FIG. 11 is a flowchart showing the flow of a process executed by an ID module when the virtual move target is played back according to user's operations at the video recorder.

FIG. 11 is a flowchart showing the flow of a process executed by the ID module 5 when a virtual move target is played back according to user's operations at the video recorder 3.
Step S601:
The ID module 5 is accessed by a playback apparatus (the video recorder 3 in this example, but the same applies to the case of the portable player 4) via the wireless I/F 52.
Step S602:
The wireless I/F 52 executes mutual authentication with the accessing video recorder 3.
Step S603:
When the mutual authentication succeeds, information from the video recorder 3 is monitored. When a request for sending a user ID is received, the user ID recorded in the playback-status management list 551 is returned. When a plurality of user IDs is recorded, all the user IDs may be sent to the video recorder 3 so that the user can select one of the user IDs by an operation input at the video recorder 3.
Step S604:
Using the user ID returned in step S603, the video recorder 3 executes matching (corresponding to step S507 in FIG. 10), and the ID module 5 monitors information that is issued based on the result of the matching. When the matching fails, a notification of the matching failure is issued (corresponding to step S513 in FIG. 10). When the ID module 5 receives the notification, the process is exited. When the notification is not received, the process proceeds to step S605.
Step S605:
When the matching succeeds, the content ID of the video content to register is sent (corresponding to step S508 in FIG. 10). When the ID module 5 receives the content ID, the process proceeds to step S606. Otherwise, the process returns to step S604, in which the ID module 5 monitors information from the video recorder 3.
Step S606:
With reference to the playback-status management list 551, the process proceeds to step S607 when the playback-status flag associated with the content ID received in step S605 indicates "0", while the process proceeds to step S610 when the playback-status flag indicates "1".
Step S607:
The playback-status flag is changed to "1", indicating that playback is underway.
Step S608:
Temporary playback permission for the video content associated with the content ID received is sent. Then, playback of the video content requested to be registered is started at the video recorder 3 in communication.
Step S609:
A process is executed for continuously monitoring whether playback of the video content with playback permission is continued subsequently. This process will be described later with reference to FIG. 13.

Step S610:
When the playback-status flag indicates "1", the video content requested to be registered is currently being played back by another playback apparatus, so that the playback apparatus is notified that playback is underway. Upon receiving the notification, the video recorder 3 displays a message indicating that playback is not allowed (step S514 in FIG. 10).

Figure 12:
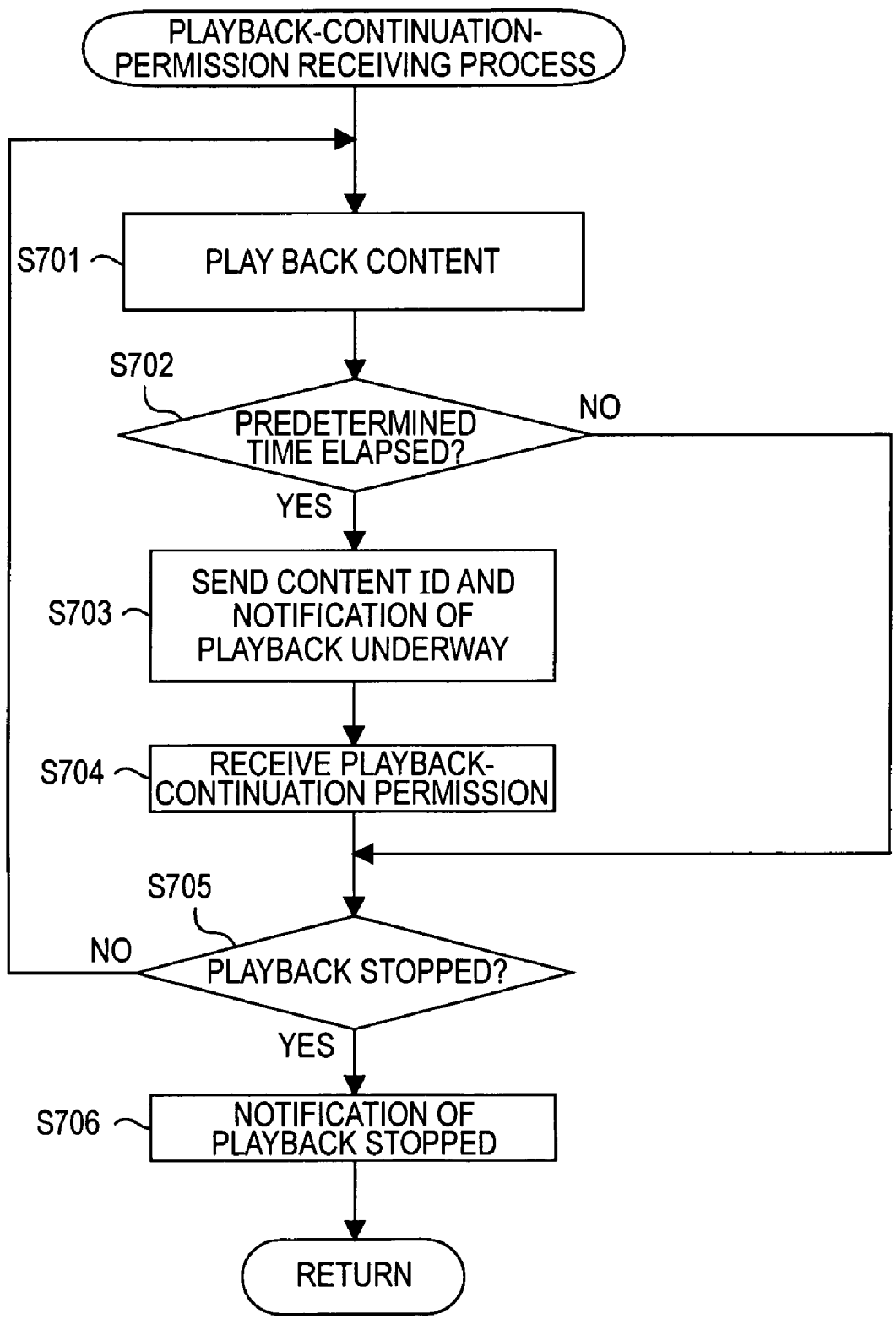
FIG. 12 is a flowchart showing the flow of a playback-continuation-permission receiving process executed by the video recorder.
Figure 13:
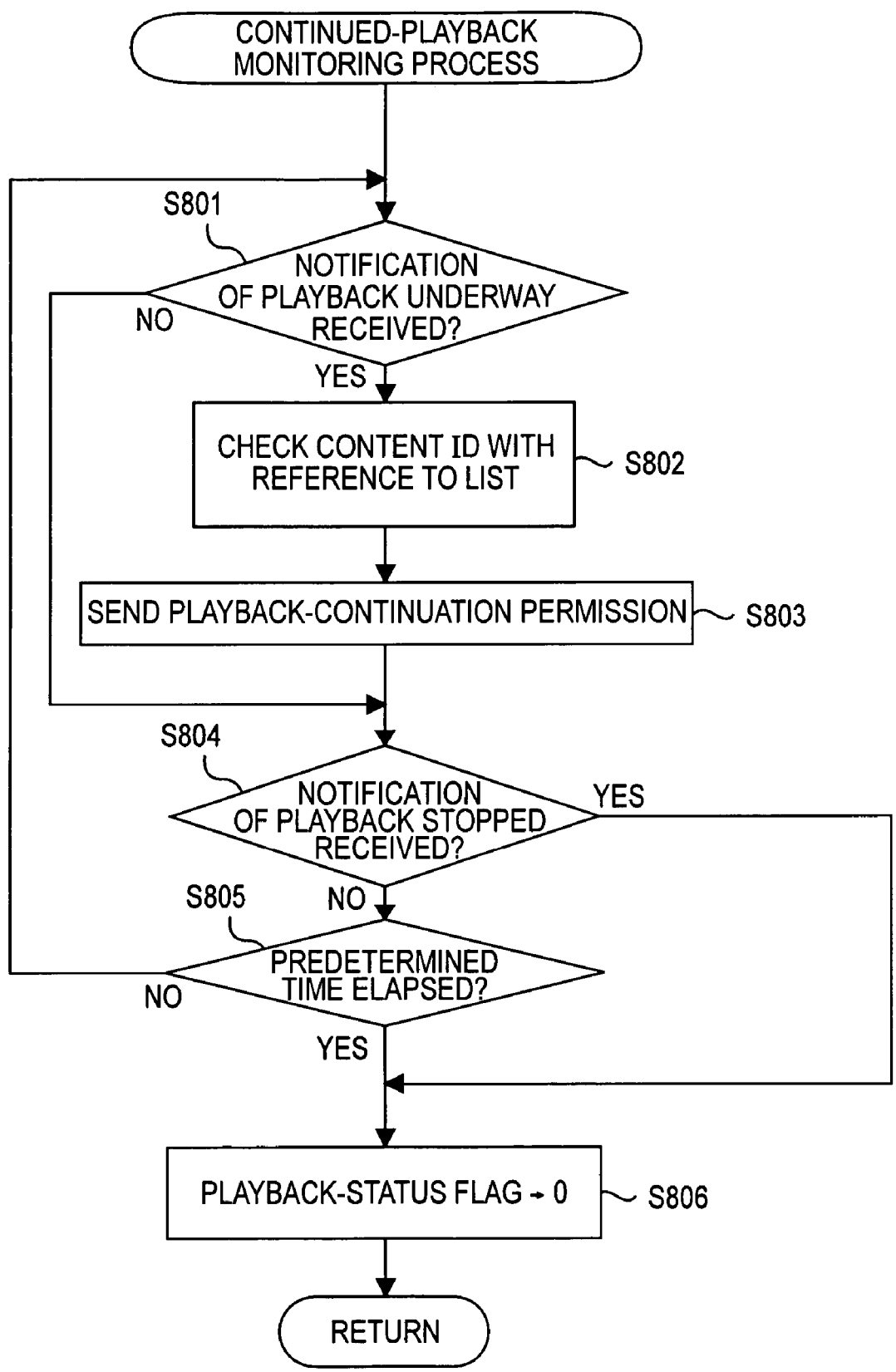
FIG. 13 is a flowchart showing the flow of a continued-playback monitoring process executed by the ID module.

By the processes described above with reference to FIGS. 10 and 11, the video recorder 3 is allowed to start playback of the content selected as the virtual move target. Then, communication between the video recorder 3 and the ID module 5 is continued as long as playback is continued, and processes described below with reference to FIGS. 12 and 13 are executed. When playback of video content that is currently being played back is requested, the playback is rejected by the ID module 5, so that the copyright of the video content is reliably protected. Furthermore, the user need not be constantly aware of video content that can be currently played back, and suffices to simply request start of playback from the video recorder 3. Thus, a highly convenient virtual move operation can be implemented.

FIG. 12 is a flowchart showing the flow of a playback-continuation-permission receiving process executed by the video recorder 3.
Step S701:
Data of video content with playback permission is decoded by the encoder/decoder 341, and playback signals are sequentially output.
Step S702:
The elapse of a predetermined time (e.g., 10 seconds) is monitored. When the predetermined time has elapsed, the process proceeds to step S703.
Step S703:
The content ID of video content that is being played back is sent to the ID module 5, and the ID module 5 is notified that the video content is being played back.
Step S704:
Playback-continuation permission is received from the ID module 5. This allows playback to be continued until the predetermined time elapses another time.
Step S705:
When the user instructs by an operation input that playback be stopped before the predetermined time elapses in step S702, the process proceeds to step S706. Otherwise, the process returns to step S701, and the playback is continued.
Step S706:
When it is instructed that playback be stopped, the ID module 5 is notified that playback is to be stopped, and the process is exited.

FIG. 13 is a flowchart showing the flow of a continued-playback monitoring process executed by the ID module 5.
Step S801:
Information from a playback apparatus (the video recorder 3 herein) is monitored via the wireless I/F 52. When a notification that playback is underway is received (corresponding to step S703 in FIG. 12), the process proceeds to step S802. At the same time, the content ID representing the video content being played back is also received. When such a notification is not received, the process proceeds to step S804.
Step S802:
With reference to the playback-status management list 551, it is checked for confirmation whether the content ID received exists and the playback-status flag indicates "1".
Step S803:
Playback-continuation permission is sent to the video recorder 3 in communication. When the playback-continuation permission is received, the video recorder 3 is allowed to continue playback of the associated video content until requesting playback-continuation permission again (corresponding to step S704 in FIG. 12).

Step S804:

When a notification that playback is to be stopped is received from the video recorder 3, the process proceeds to step S806, while the process otherwise proceeds to step S805.

Step S805:

The elapse of the predetermined time is monitored, and if no information is received from the video recorder 3 when the predetermined time has elapsed, it is determined that playback has been stopped (or the video recorder 3 and the ID module 5 have become remote from each other), so that the process proceeds to step S806. Otherwise, the process returns to step S801, in which information from the video recorder 3 is monitored.

Step S806:

The playback-status flag associated with the content ID, having indicated that playback is underway, is returned to "0".

By the processes described above with reference to FIGS. 12 and 13, the video recorder 3 is allowed to continue playback of the video content of the virtual move target by receiving playback-continuation permission from the ID module 5 at predetermined time intervals. Furthermore, while the playback is continued, in the playback-status management list 551 of the ID module 5, the associated playback-status flag is set to "1" so that playback requests from other playback apparatuses are rejected, whereby a virtual move operation is implemented.

Although the playback operation of the playback apparatus is constantly monitored by the ID module 5 in the cases described above with reference to FIGS. 12 and 13, alternatively, playback may be permitted for a period equivalent to or longer than a playback time of video content when playback permission for a virtual move target is first requested, not assigning playback permission to other playback apparatuses during that period.

In the processes described above with reference to FIGS. 10 and 11, a virtual move target is played back according to user's operations at the video recorder 3. However, operation inputs for playback may be executed at the ID module 5.

Figure 14:
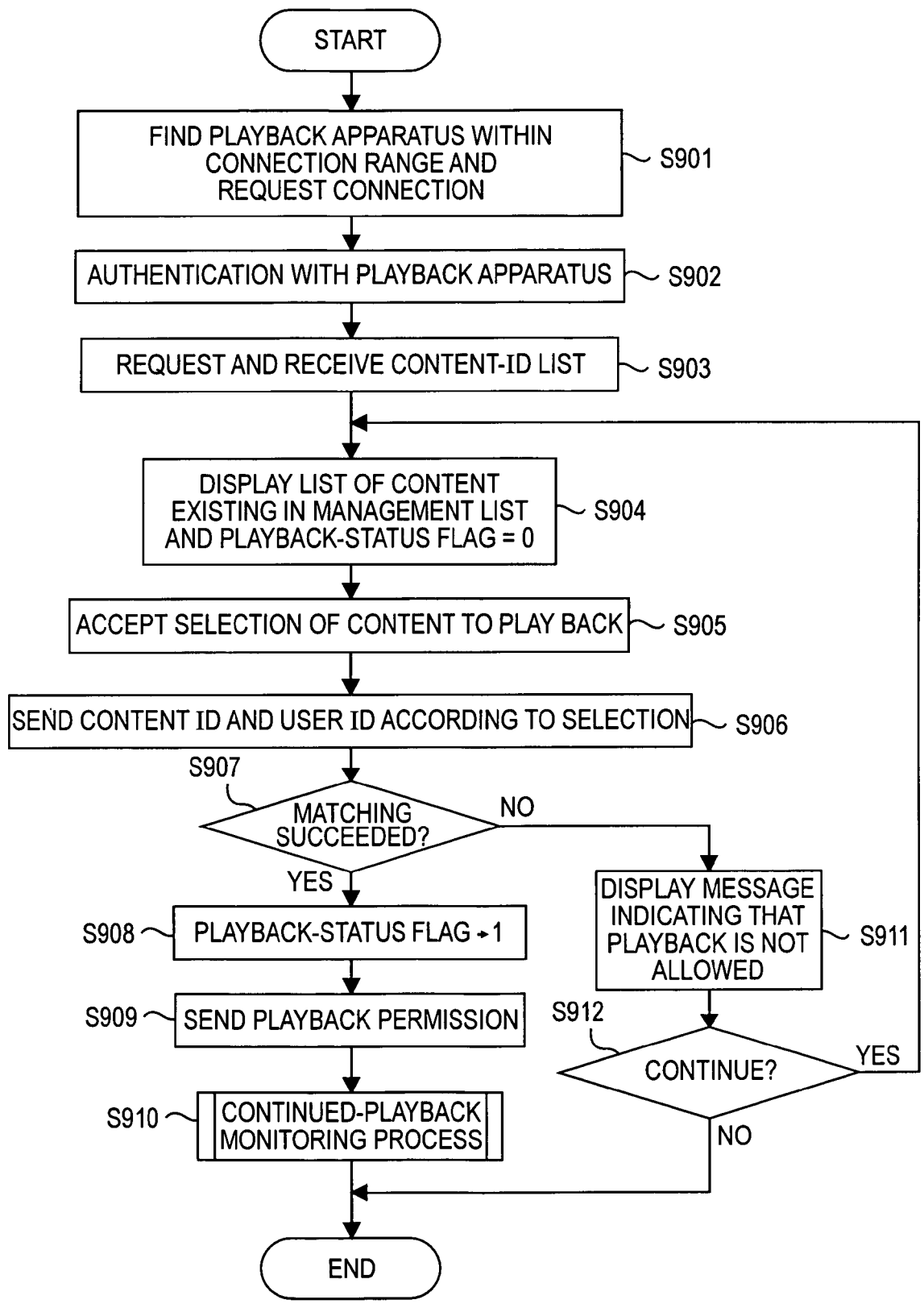
FIG. 14 is a flowchart showing the flow of a process executed by the ID module when the virtual move target is played back according to user's operations at the ID module.

FIG. 14 is a flowchart showing the flow of a process executed by the ID module 5 when a virtual move target is played back according to user's operations at the ID module 5.

Step S901:

When playback of a virtual move target is requested by an operation input by the user via the input unit 53, the controller 51 searches for a playback apparatus located within a connectable range via the wireless I/F 52, and requests connection to the playback apparatus found by the searching. When a plurality of playback apparatuses is found by the searching, a list of connectable playback apparatus is displayed on the display unit 54 to accept selection input by the user.

Step S902:

The wireless I/F 52 executes mutual authentication with the playback apparatus in connection.

Step S903:

When the mutual authentication succeeds, a list of content IDs of video content recorded on the playback apparatus in connection is requested. Upon receiving the request, the playback apparatus searches for video content recorded on its own recording medium, and returns a list of content IDs of the content. The ID module 5 receives the list.

Step S904:

Of the content IDs received, a list of the names of video content with content IDs existing in the playback-status management list 551 and playback-status flags indicating "0" is displayed on the display unit 54.

Step S905:

A selection input by the user for selecting video content to play back from among the video content displayed is accepted via the input unit 53.

Step S906:

A content ID according to the selection input and an associated user ID are sent to the playback apparatus. Upon receiving these pieces of information, the playback apparatus reads a user ID from the playback-management information 332 of the video content associated with the content ID, compares the user ID with the user ID received, and returns the result of the matching to the ID module 5.

Step S907:

The result of the matching is received from the playback apparatus. The process proceeds to step S908 when the matching succeeds, while the process proceeds to step S911 when the matching fails.

Step S908:

When the matching succeeds, the playback-status flag associated with the content ID sent in step S906 is changed to "1".

Step S909:

Playback permission is sent to the playback apparatus. Then, the video content specified by the user is played back by the playback apparatus.

Step S910:

A continued-playback monitoring process similar to the process shown in FIG. 13 is executed, whereby the playback of the video content by the playback apparatus is continued.

Step S911:

When the matching fails in step S907, the user is notified that playback of the specified video content is not allowed by a message displayed on the display unit 54.

Step S912:

According to an operation input by the user, it is determined whether to continue processing for starting playback of another piece of video content. When the processing is to be continued, the process returns to step S904, and otherwise the process is exited.

As described above, a virtual move target on a playback apparatus connected by wireless can be played back by user's operations at the ID module 5. For example, on the display unit 54 of the ID module 5, the user is allowed to select video content that can be played back. Thus, the user need not be constantly aware of video content that can be played back, so that convenience is improved.

Next, a process for returning video content in a playback apparatus from a virtual move target will be described.

Figure 15:
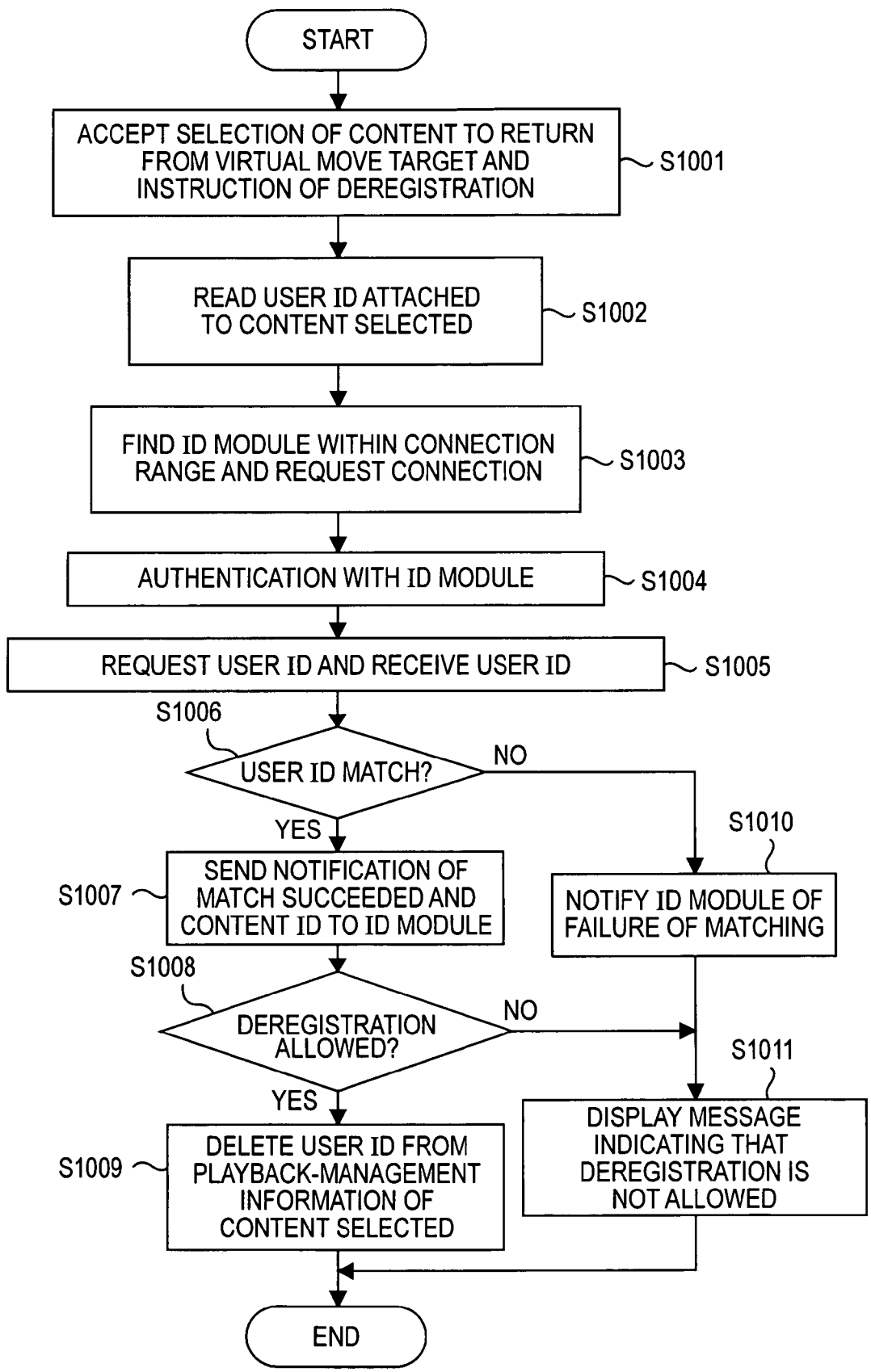
FIG. 15 is a flowchart showing the flow of a process executed by the video recorder when returning from the virtual move target.

FIG. 15 is a flowchart showing the flow of a process executed by the video recorder 3 when video content is returned from a virtual move target.

Step S1001:

By input operations by the user via the input unit 36, selection of video content to return from a virtual move target from among video content of virtual move targets in the HDD 33 is accepted, and an instruction for starting deregistration is input.

Step S1002:

The user ID attached to the playback-management information 332 of the video content selected is read.

Step S1003:

An ID module 5 that exists in a connectable range is searched for via the wireless I/F 38, and connection is requested to the ID module 5 found by the searching.

Step S1004:

The wireless I/F 38 executes mutual authentication with the ID module 5 in connection.

Step S1005:

When the mutual authentication succeeds, a wireless communication link with the ID module 5 is established. Then, a request for sending a user ID is issued, and the user ID is received.

Step S1006:

The user ID received is compared with the user ID read in step S1002. The process proceeds to step S1007 when these user IDs match, while the process otherwise proceeds to step S1010.

Step S1007:

A notification that the matching has succeeded and the content ID that is to be deregistered are sent to the ID module 5.

The ID module 5, with reference to the playback-status management list 551, determines that deregistration is allowed when the playback-status flag associated with the content ID received indicates "0", deletes and deregisters the content ID, and sends permission for deregistration to the video recorder 3. On the other hand, when the playback-status flag indicates "1", since the video content is currently being played back by another playback apparatus, the video recorder 3 is notified that deregistration is not allowed.

Step S1008:

When the permission for deregistration from the ID module 5 is received by the video recorder 3, the process proceeds to step S1009. On the other hand, when a notification that deregistration is not allowed is received, the process proceeds to step S1011.

Step S1009:

When the permission for deregistration is received, permanent playback permission from the ID module 5 is obtained. Thus, the user ID is deleted from the playback-management information 332 of the video content selected as a target of deregistration, whereby the video content is returned from the virtual move target so that the video content can be played back without receiving playback permission from the ID module 5. For example, the playback condition in the playback-management information 332 is altered so that the video content can be played back without playback permission. Furthermore, by receiving key information or a part of the key information from an ID module, data of the video content may be once decrypted and then encrypted again using information irrelevant to the ID module 5 as key information, such as the device ID of the HDD 33.

Step S1010:

When the matching of user IDs fails, the ID module 5 is notified of the failure of the matching. The process then proceeds to step S1011.

Step S1011:

The user is notified that deregistration is not allowed by a message displayed. The process is then exited.

The process for returning from a virtual move target, described above, is executed according to operation inputs by the user at the playback apparatus. Alternatively, returning may be executed according to operation inputs by the user at the ID module 5.

Referring back to FIG. 8, the effect of returning from a virtual move target will be described. As described earlier, when copying the content data 331a as a virtual move target to a recording medium with a small storage capacity, such as the memory card 6, the content data 331b having a reduced bit rate is copied. However, the original content data 331a whose bit rate is not converted is not deleted from the source playback apparatus (the video recorder 3), so that it is possible to return to the original state where playback is allowed without receiving playback permission from the ID module 5. Thus, even after a virtual move is executed, by returning from the virtual move, original data whose quality is not degraded can be played back as before. Furthermore, returning does not involve transfer of data of the video content itself, so that processing time for returning is short.

As described above, in this embodiment (first example process), problems regarding the length of data transfer time or degradation in quality associated with move operations are alleviated, and the user need not be aware of the management of content that can be played back. Thus, move operations that are highly convenient for the user are achieved.

Second Example Process

Figure 16:
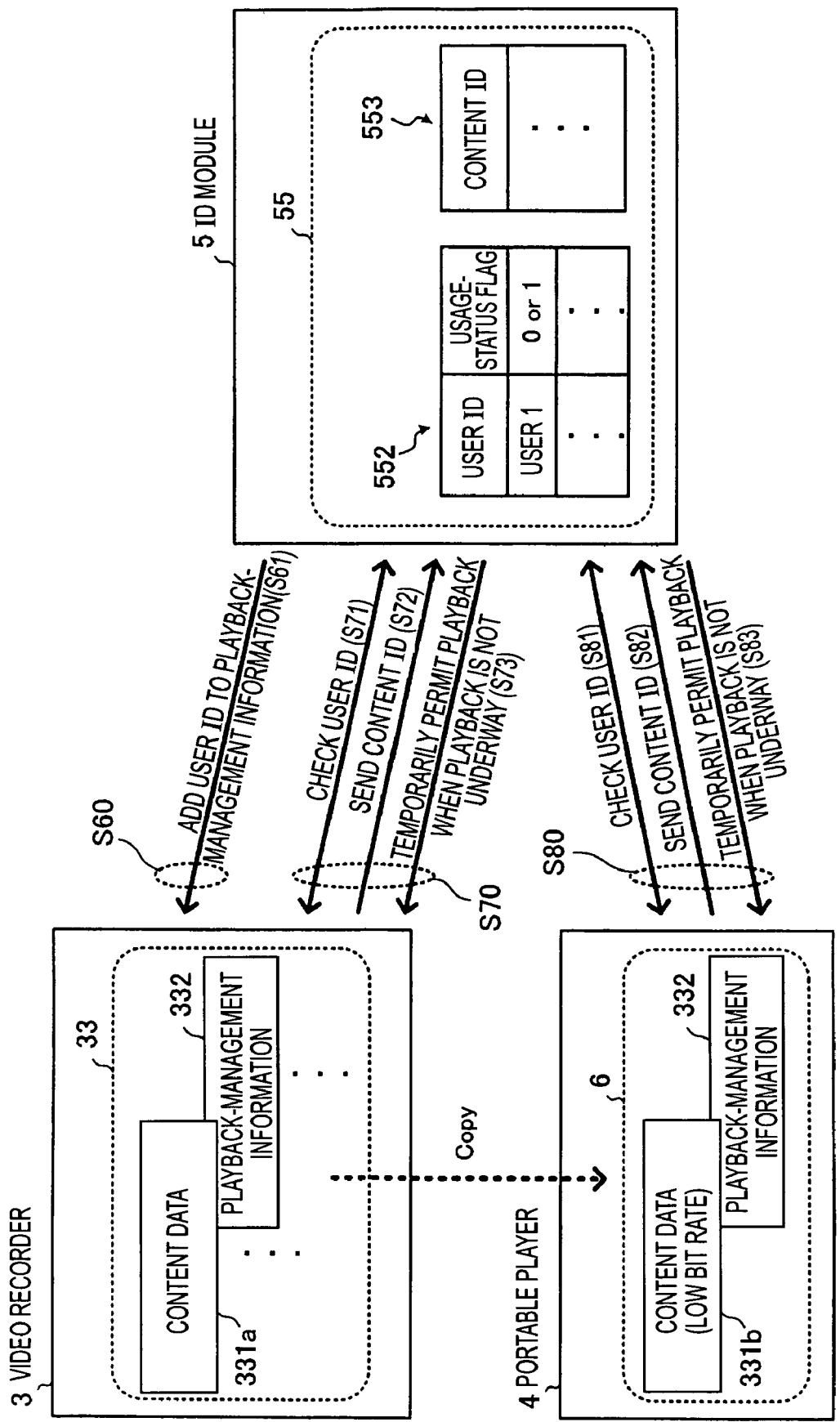
FIG. 16 is a diagram showing the scheme of a move operation in the content playback system according to a second example process in the second embodiment of the present invention.

FIG. 16 is a diagram showing the scheme of a move operation in the content playback system according to a second example process.

In the second example process shown in FIG. 16, similarly to the first example process shown in FIG. 8, in order to execute a virtual move operation, first, a step of registering video content in the video recorder 3 as a virtual move target (step S60) is executed, and then each playback apparatus (the video recorder 3 and the portable player 4 herein) obtains temporary playback permission from the ID module 5 and plays back the virtual move target (steps S70 and S80).

As opposed to the first example process, when a virtual move target is registered, a user ID is simply added to the playback-management information 332 of the content data 331a (step S61) without registering the content ID in the ID module 5. Thus, in a playback-status-management list 552 held in the non-volatile memory 55 of the ID module 5, only the playback status flag is associated with the user ID.

This method of registration is applied, for example, to a case where a playback apparatus includes an irremovable recording medium, such as an HDD, and a single user ID is used to select all digital content in the recording medium as virtual move targets. By specializing in management on a basis of each playback apparatus without managing playback status on a basis of each piece of content, processing for management can be simplified. Furthermore, when digital content in each playback apparatus is managed using the playback-status-management list 552, it is not possible to return digital content that has once been registered as a virtual move target.

However, by maintaining in the ID module 5 the content ID of digital content that is requested to be returned, returning becomes possible. The content ID of the digital content returned is managed in a returned-content list 553 in the non-volatile memory 55 of the ID module 5.

More specifically, after the matching of user IDs with the ID module 5 succeeds, the playback apparatus notifies the ID module 5 of the content ID of digital content that is to be returned from a virtual move target. Based on a playback-status-management flag, the ID module 5 records the content ID in the returned-content list 553 and permits deregistration for the playback apparatus when the digital content is not being played back. Thus, the digital content is returned to a state where playback is allowed without receiving playback permission from the ID module 5. Furthermore, the content ID in the returned-content list 553 should be constantly in record until digital content associated therewith is again registered as a virtual move target.

Referring next to FIG. 16, a playback operation in a case where the above management method is employed will be described. To play back the content data 331a in the video recorder 3, selected as a virtual move target, a wireless communication channel is established between the video recorder 3 and the ID module 5, and then a user ID held by the ID module 5 is compared with a user ID recorded in the playback-management information 332 associated with the content data 331a (step S71).

When these user IDs match, the video recorder 3 sends the content ID of the content data 331a to the ID module 5 (step S72). With reference to the returned-content list 553, the ID module 5 assigns temporary playback permission to the video recorder 3 when the content ID received is not recorded therein and the associated playback-status flag in the playback-status-management list 552 indicates "0" (step S73). At the same time, the ID module 5 sets the associated playback-status flag in the playback-status-management list 552 to "1". Then, the content data 331a in the video recorder 3 is played back, and playback of the same digital content by other playback apparatuses is prohibited.

The content data 331b in the memory card 6 can also be played back by executing a similar process (steps S81 to S83) in the portable player 4.

The second example process described above is suitable in cases where a virtual move operation of digital content is managed on a basis of each playback apparatus. Similarly to the first example process, problems associated with move operations are solved, and move operations that are highly convenient for the user are achieved.

In the second embodiment, when video content is encrypted using key information held by an ID module when registering a virtual move target in the ID module, re-encoding for reducing the bit rate is not possible when copying the video content to another recording medium, such as a memory card. Thus, also in this case, the video recorder is once connected to the ID module in order to receive permission.

More specifically, when matching of user IDs with a video recorder connected succeeds, or when the content ID of a target is sent to the ID module 5 after the matching and it is determined that playback is not underway, permission is received from the ID module 5, and a decryption key is obtained to decrypt data of the video content. Furthermore, the decrypted data is decoded for expansion, is then encoded for compression to achieve a predetermined bit rate, is then encrypted using an encryption key from the ID module, and is then transferred to a memory card or the like. At this time, the user ID attached to the original video content is attached to the encrypted video content. Thus, by attaching a memory card to which video content has been copied to another player having a virtual move control function similar to that of the video recorder and connecting the player to the ID module, the video content in the memory card can be played back.

The embodiments have been described above in the context of cases where the present invention is applied to a video player that is capable of receiving and recording digital broadcasting as an example of a playback apparatus that is capable of playing back video content recorded on a recording medium and transferring the video content to another recording medium. However, the present invention can be applied to any recording and playback apparatus or playback apparatus for digital content. Furthermore, without limitation to video content, the digital content may be of various types, such as audio content or text content. Furthermore, without limitation to an attached portable recording medium, copying of data of digital content may be executed with a recording medium of another playback apparatus connected via a communication I/F.

It should be understood by those skilled in the art that various modifications, combinations, sub-combinations and alterations may occur depending on design requirements and other factors insofar as they are within the scope of the appended claims or that equivalents thereof.

What is claimed is:

1. An information management method for managing whether to allow playback of copyrighted content using a portable player for playing back content from a recording medium and an information management apparatus that communicates with the portable player and having the content recorded in a storage, the information management apparatus configured to manage playback permission of the content at the portable player with a table, the information management method comprising:

reducing a bit rate of the content that is stored at the information management apparatus and maintaining a original copy of the content on the storage of the information management apparatus, based on capability information related to the portable player that is stored on the recording medium;

moving the content with reduced bit rate to the recording medium of the portable player;

registering a destination identification associated to the portable player and the content with the reduced bit rate at the information management apparatus in the table;

playback-permission requesting, executed by the playback controlling means of the portable player, after the content with reduced bit rate has been received at the portable player, by sending a playback request for the content with the reduced bit rate that is in a playback-prohibition state to the information management apparatus, for requesting the information management apparatus to issue playback permission for the portable player for the received content based on the playback-management information;

temporary-permission sending, executed by playback-status management means of the information management apparatus, after a playback-permission request for content is received from the portable player, of returning temporary-permission information for temporarily permitting playback to the portable player only when the content is not being played back by another information playback apparatus by verifying said table of the information management apparatus;

playback processing, executed by the playback controlling means of the portable player, when the temporary-permission information from the information management apparatus is received, of temporarily permitting playback of the associated content on the recording medium by the portable player; and deleting the content with reduced bit rate that is stored on the recording medium of the portable player after said step of playback processing, and updating a status for playback permission for the content at the table of the information management apparatus.

2. The information management method according to claim 1, wherein in said step of playback processing, when the user identification information associated in the table of the playback-management information with the content identification information representing the content for which playback permission has been requested by the portable player coincides with the user identification information received from the information management apparatus, playback of the content is temporarily permitted at the portable player.

3. The information management method according to claim 1, wherein in said temporary-permission sending, whether content for which a playback-permission request has been received is being played back by another information playback apparatus is managed for each piece of the user identification information by means of the table.

4. The information management method according to claim 1, wherein in said temporary-permission sending, whether content for which a playback-permission request has been received is being played back by another information playback apparatus is managed in the table for each piece of the content identification information.

5. The information management method according to claim 1, further comprising:
returning requesting, executed by the playback management means of the portable player, of sending a returning request for allowing playback of content with the reduced bit rate entered into the playback-prohibition state on the recording medium to the information management apparatus;
playback-permission sending, executed by the playback-status management means of the information management apparatus, when the returning request for the content is received, of returning playback-permission information to the portable player for the content only when the content is not being played back by another information playback apparatus; and
invalidation canceling, executed by the playback management means of the portable player when the playback-permission information is received, of updating the playback-management information at the table so that the playback-prohibition state of the associated content on the recording medium is canceled.

6. The information management method according to claim 5,
wherein in said playback-permission sending, the content identification information representing content relevant to the returning request is registered in returned-content information of the table, and
wherein in said temporary-permission sending, the temporary-permission information is returned when content relevant to a playback-permission request is not being played back by another information playback apparatus, and the content identification information representing the content is not registered in the returned-content information.

7. The information management method according to claim 5, wherein in said playback processing, the information management apparatus is regularly accessed and the temporary-permission information is received to continue playback of the content by the portable player.

8. The information management method according to claim 5, wherein the temporary-permission information sent in said temporary-permission sending is information for permitting playback of the associated content for a period that is equivalent to or longer than a playback period of the content by the portable player.

9. A portable media player for playing back content from a recording medium, the content stored at a storage of an information management apparatus, the portable media player comprising:
communication means for communicating with an information management apparatus that manages playback permission for content with a table, and for receiving content with a reduced bit rate of the content that is stored at the information management apparatus, an original copy of the content is maintained on the storage of the information management apparatus, the reduced bit rate being based on capability information related to the portable player that is stored on the recording medium, and a destination identification associated to the portable player and the content with the reduced bit rate being registered at the information management apparatus in the table; playback controlling means for requesting the information management apparatus by the portable media player to issue playback permission for the received content with the reduced bit rate via the communication means, and temporarily permitting playback of the associated content on the recording medium after a temporary playback permission for temporarily permitting playback is received by the portable media player from the information management apparatus, after the information management apparatus has verified said table, via the communication means, and
a control means for deleting the content with the reduced bit rate that is stored on the recording medium of the portable player, after said content with the reduced bit rate has been played back, and for updating a status for playback permission for the content at the table of the information management apparatus.

10. The portable media player according to claim 9,
wherein when a playback request for the content in a playback-prohibition state is received, the playback controlling means temporarily permits playback of the content by the portable media player after it has been determined that the user identification information associated with the content identification information representing the content with the reduced bit rate relevant to the playback request coincides with the user identification information received from the information management apparatus via the communication means and the temporary playback permission is received.

11. The portable media player according to claim 9, wherein the playback controlling means, after receiving the temporary playback permission, regularly accesses the information management apparatus and receives the temporary permission information further times to continue playback of the content by the portable media player.

12. The portable media player according to claim 9,
wherein the temporary permission information is information for permitting playback of the associated content for a playback-permission period that is equivalent to or longer than a playback period of the content, and
wherein the playback controlling means, after receiving the temporary playback permission, prohibits playback of the content when the playback-permission period has elapsed.

13. An information management apparatus for managing playback permission of content for a portable media player configured to play back content from a recording medium, the content recorded in a storage of the information management apparatus, the information management apparatus comprising:
communication means for communicating with the portable media player, for sending content with a reduced bit rate of the content that is stored at the information management apparatus, an original copy of the content is maintained on the storage of the information management apparatus, the reduced bit rate being based on capability information related to the portable player that is stored on the recording medium, and a destination identification associated to the portable player and the content with the reduced bit rate being registered at the information management apparatus in a table and configured to receive a playback permission request from the portable media player, and to issue playback permission for the content based on playback-management information that is stored in the table at the information management apparatus after receiving the playback permission request and after the content of the reduced bit rate has been received at the portable media player; and playback-status management means for returning, when said playback-permission request for content entered into a playback-prohibition state in the portable media player is received from the portable media player via the communication means, temporary permission information for temporarily permitting playback only by the portable media player by verifying said table of the information management apparatus, when the content is not being played back by another portable media player, and after the content with reduced bit rate stored on the recording medium of the portable player is played back and deleted, updating a status for playback permission for the content at the table of the information management apparatus.

14. The information management apparatus according to claim 13, wherein when the playback-permission request is received from the portable media player, the playback-status management means determines whether content relevant to the request is being played back by another information playback apparatus for each piece of the user identification information by using the table.

15. The information management apparatus according to claim 13, wherein when the playback-permission request is received from the portable media player, the playback-status management means determines whether content relevant to the request is being played back by another portable media player for each piece of content identification information by using the table.

16. The information management apparatus according to claim 13, wherein when the playback-permission request is received from the portable media player, the playback-status management means determines whether content relevant to the request is being played back by another portable media player for each piece of the content identification information by using the table, and wherein when the returning request is received from the portable media player, the playback-status management means determines whether content relevant to the request is being played back by another portable media player for each piece of the content identification information by using the table, and when the content is not being played back, returns the playback-permission information associated with the content and deletes the associated content identification information from the playback-status management information at the table.

17. The information management apparatus according to claim 13, wherein when the returning request is received, the playback-status management means registers content identification information representing content relevant to the returning request in returned-content information of the table, and wherein when the playback-permission request is received, the playback-status management means returns the temporary permission information when the relevant content is not being played back by another portable media player and the content identification information representing the content is not registered in the returned-content information.

18. The information management apparatus according to claim 13, wherein the playback-status management means, after sending the temporary permission information, monitors the playback-permission request from the portable media player at the sending destination at regular intervals, and prohibits playback of the associated content by the portable media player when the playback-permission request is not received.

19. An portable media player for playing back content from a recording medium, the content stored at a storage of an information management apparatus, the portable media player comprising:

a communication unit configured to communicate with an information management apparatus that manages playback permission for content by using a table, and configured to receive content with a reduced bit rate of the content that is stored at the information management apparatus, an original copy of the content is maintained on the storage of the information management apparatus, the reduced bit rate being based on capability information related to the portable player that is stored on the recording medium, and a destination identification associated to the portable player and the content with the reduced bit rate being registered at the information management apparatus in the table;

a playback controller configured to request the information management apparatus to issue playback permission for the content via the communication unit after the content with the reduced bit rate has been received at the portable media player by the recording medium, and temporarily permitting playback of the received content on the recording medium after a temporary playback permission for temporarily permitting playback is received by the portable media player from the information management apparatus, after the information management apparatus has verified said table, via the communication unit; and a control unit configured to delete the content with the reduced bit rate that is stored on the recording medium of the portable player, after said content with the reduced bit rate has been played back, and configured to update a status for playback permission for the content at the table of the information management apparatus.

* * * * *